United States Patent
Rameau et al.

(10) Patent No.: US 12,229,477 B2
(45) Date of Patent: Feb. 18, 2025

(54) DESIGNING A MECHANISM

(71) Applicant: DASSAULT SYSTEMES, Velizy Villacoublay (FR)

(72) Inventors: Jean-François Rameau, Lisses (FR); Ruixian Renaud, Velizy Villacoublay (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 769 days.

(21) Appl. No.: 17/132,650

(22) Filed: Dec. 23, 2020

(65) Prior Publication Data
US 2021/0200914 A1 Jul. 1, 2021

(30) Foreign Application Priority Data
Dec. 27, 2019 (EP) .................................... 19306781

(51) Int. Cl.
| | |
|---|---|
| *G06F 30/17* | (2020.01) |
| *G06F 3/0486* | (2013.01) |
| *G06F 17/13* | (2006.01) |
| *G06F 30/12* | (2020.01) |
| *G06F 111/04* | (2020.01) |
| *G06F 111/10* | (2020.01) |

(52) U.S. Cl.
CPC .............. *G06F 30/17* (2020.01); *G06F 30/12* (2020.01); *G06F 3/0486* (2013.01); *G06F 17/13* (2013.01); *G06F 2111/04* (2020.01); *G06F 2111/10* (2020.01)

(58) Field of Classification Search
CPC ........ G06F 30/17; G06F 30/12; G06F 3/0486; G06F 17/13; G06F 2111/04; G06F 2111/10; G06F 2111/06; G06F 30/00; G06F 30/18
See application file for complete search history.

(56) References Cited

PUBLICATIONS

Renaud, R .. "Generation des conditions d'existence d'une classe de systèmes de solides surcontraints avec les bases de Gröbner" [Thesis] Ecole Centrale Paris, 2014. Français. NNT:2014ECAP0015. [retrieved on Jun. 9, 2023] (Year: 2014).*
Liu, Z. "Kinematic Optimization of Linkages" [Thesis] Department of Mechanical Engineering, McGill University [retrieved on Jun. 9, 2023] (Year: 1993).*

(Continued)

*Primary Examiner* — Kamini S Shah
*Assistant Examiner* — Alfred H B Wechselberger
(74) *Attorney, Agent, or Firm* — Oblon, McClelland, Maier & Neustadt, L.L.P.

(57) ABSTRACT

A method for designing a mechanism including rigid bodies and mechanical joints including obtaining input parameter values which represent the mechanism in an input state. The method also includes determining output parameter values which represent the mechanism in an output state. The determining includes minimizing an objective function under constraints. The objective function penalizes a distance between the output dimensional values and the input dimensional values. The constraints include a first constraint representing verification of the closure equation by the output parameter values. The constraints further include a second constraint representing mobility of the mechanism in the output state. This forms an improved solution for designing a mechanism comprising rigid bodies and mechanical joints.

20 Claims, 9 Drawing Sheets

(56) References Cited

PUBLICATIONS

Lee et al. "Developments in quantitative dimensional synthesis (1970-present): four-bar path and function generation" Inverse Problems in Science and Engineering, vol. 26, No. 9, p. 1280-1304; https://doi.org/10.1080/17415977.2017.1396328 [ retrieved on Jun. 9, 2023] (Year: 2017).*

Mariappan, J. "A Unified Exact Gradient Approach for Optimal Synthesis of Mechanisms" Mechanical Engeering, University of Massachusetts Amherst [retrieved on Jun. 8, 2023] (Year: 1994).*

Ledezma, D. "An Approach To Tolerances For The Concurrent Design Of Products And Manufacturing And Assembly Processes" Department of Industrial Engineering, North Carolina State University [retrieved on Jun. 8, 2023] (Year: 1996).*

Armillota, A. "A method for computer-aided specification of geometric tolerances" Computer-Aided Design, vol. 45, pp. 1604-1616 [retrieved on Jun. 8, 2023] (Year: 2013).*

Hu, J. "Concurrent and Collaborative Modeling for Parameter and Tolerance Design based on Constraints Network" SMC'03 Conference Proceedings (Cat. No.03CH37483); 10.1109/ICSMC.2003. 1245 [retrieved on Jun. 8, 2023] (Year: 2003).*

Mariappan et al. "A Generalized Exact Gradient Method for Mechanism Synthesis" Mech. Mach. Theory, vol. 31, No. 4, pp. 413-421 [retrieved on Jun. 9, 2023] (Year: 1996).*

Daniali et al. "A novel algorithm for kinematic and dynamic optimal synthesis of planar four-bar mechanisms with joint clearance" Journal of Mechanical Science and Technology, vol. 29, No. 5, pp. 2059-2065; DOI: www.springerlink.com/content/1738-494x DOI 10.1007/s12206-015-0426-1 (Year: 2015).*

Cossalter et al. "Optimum Synthesis of Spatial Function Generator Mechanisms" Meccanica, vol. 28, pp. 263-268 [retrieved on Jun. 9, 2023] (Year: 1993).*

Rameau, J.-F., et al. "Clearance vs. tolerance for Rigid Overconstrained Assemblies", CAD Comput. Aided Des. vol. 97, Apr. 1, 2018 (Apr. 1, 2018), pp. 27-40, XP055708150.

Rameau, J.-F., et al., "Computing Mobility Condition Using Groebner Basis", Mechanism and Machine Theory vol. 91, Apr. 16, 2015 (Apr. 16, 2015), pp. 21-38, XP029165920.

Liu Ruixian, et al., "A Tool to Check Mobility Under Parameter Variations in Over-constrained Mechanisms", Mechanism and Machine Theory, vol. 69, Jun. 4, 2013 (Jun. 4, 2013), pp. 44-61, XP028681872.

Hongwei Guo, et al., "Type synthesis of 1-12 Deployable Single-loop Overconstrained Linkages Based on Bennett Linkages", Mechanism and Machine Theory, vol. 120, Sep. 25, 2017 (Sep. 25, 2017), pp. 1-29, XP085271109.

Extended Search Report issued Jul. 6, 2020, in European Patent Application No. 19306781.6 (12 pages).

* cited by examiner

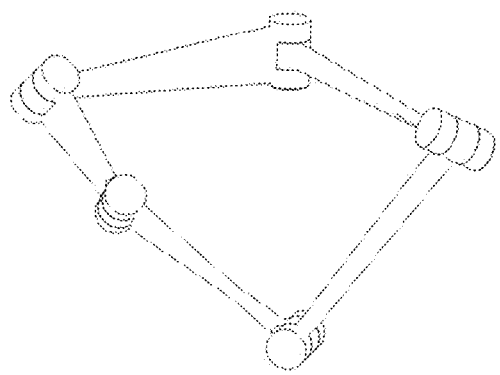
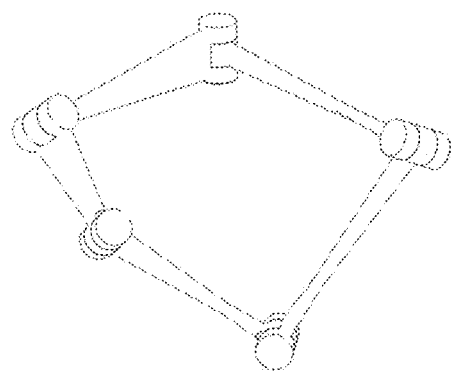
FIG. 24  FIG. 25
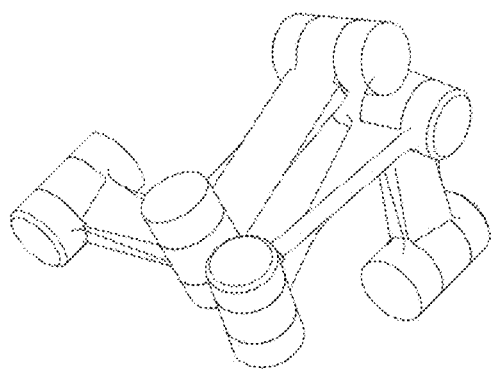
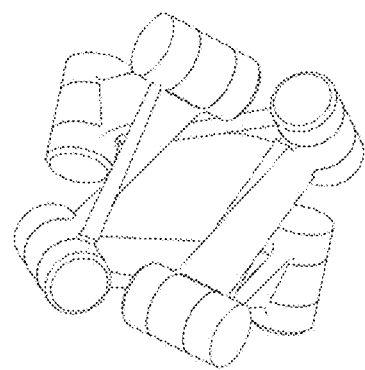
FIG. 26  FIG. 27
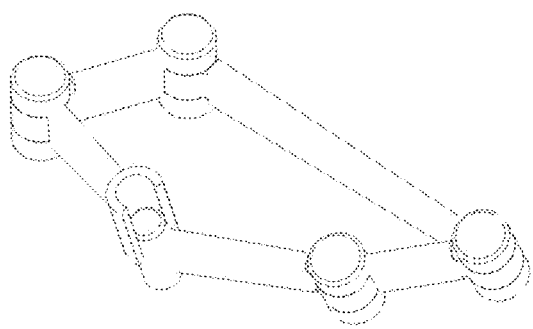
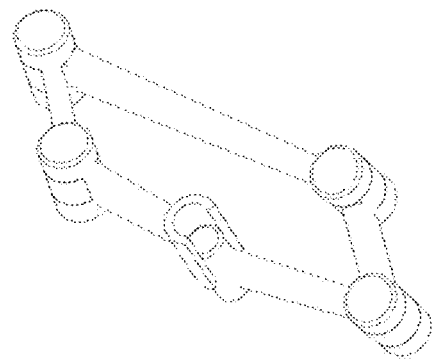
FIG. 28  FIG. 29

DESIGNING A MECHANISM

CROSS-REFERENCE TO RELATED APPLICATIONS

This application claims priority under 35 U.S.C. § 119 or 365 to European Application No. 19306781.6, filed Dec. 27, 2019. The entire contents of the above application(s) are incorporated herein by reference.

FIELD

The disclosure relates to the field of computer programs and systems, and more specifically to a method, system and program for designing a mechanism comprising rigid bodies and mechanical joints.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Solutions which allow or help the design of mechanisms comprising rigid bodies and mechanical joints are gaining wide importance. Designing a mobile mechanism by using a CAD system is indeed becoming more and more popular.

Some CAD systems notably allow the designer to deal with a virtual version of the mechanism at an early design step.

Throughout the present disclosure, it may be referred to the following documents:

1. Renaud R., *Génération des conditions d'existence d'une classe de systèmes de solides surcontraints avec les bases de Gröbner* (Generation of compatibility conditions for a family of over-constrained systems using Gröbner bases), Ph.D thesis, LISMMA (EA2336), Ecole doctorale de Centrale Paris, (2014).
2. Liu, R., Serré, P., Rameau, J.-F., Clément, A., 2015. *Generic Approach for the Generation of Symbolic Dimensional Variations Based on Gröbner Basis for Over-constrained Mechanical Assemblies*. Procedia CIRP 27, 223-229.
3. Rameau, J.-F., Serré, P., 2016. *Dimensional perturbation of rigidity and mobility*. CAD Comput. Aided Des. 71, 1-14.
4. A. Lieutier, J. F. Rameau, *Mechanical linkage design and NP-hardness*, Mechanism and Machine Theory 82 (2014) 97-114.
5. Rameau, J.-F., Serré, P., Moinet, M., 2018. *Clearance vs. tolerance for rigid overconstrained assemblies*. CAD Comput. Aided Des. 97(2018), 27-40.
6. Rameau, J.-F., Serré, P., 2015. *Computing mobility condition using Groebner basis*. Mechanism and Machine Theory 91 (2015) 21-38.
7. Ruixian Liu, Philippe Serré, Jean-Frangois Rameau, *A tool to check mobility under parameter variations in over-constrained mechanisms*, Mechanism and Machine Theory 69 (2013) 44-61.
8. C. Mavroidis et al., *Analysis and synthesis of over-constrained mechanisms*, 1994.
9. O. Selvi, *Structural and Kinematic Synthesis of Over-constrained Mechanisms*, 2012.
10. C. Mavroidis et al., *A spatial over-constrained mechanism that can be used in practical applications*, 1995.
11. X. Kong, *Kinematic analysis of a 6R single-loop over-constrained spatial mechanism for circular translation*, 2015.
12. Wang et al., *Three-face over-constrained scissor-type lifting mechanism*, 2010.
13. Y. Chen, *Design of Structural Mechanisms*, 2003.
14. Q. Yin, T. Yang, *Overconstrained analysis on spatial 6-link loops*, Mechanism and Machine Theory 37 (2002) 267-278.

All through the present disclosure, the expression "degree(s) of freedom" may be written DOF. A typical mechanism is made of rigid bodies connected together by perfect mechanical joints. Typical one DOF mechanical joints are: revolute, screw, prismatic. Typical two DOF mechanical joints are: cylindrical, spherical with pin. Typical three DOF mechanical joints are: spherical, planar. Typical four DOF mechanical joints are: ball-cylinder, cylinder-plane. Typical five DOF mechanical joint is ball-plane. Despite each mechanical joint features at least one DOF, the overall mobility or rigidity of a mechanism is closely related to the way bodies and joints are organized. Kinematic pairs and DOF are well known in the art, for example from document [13].

State of the art provides the Kutzbach-Grubler criterion (also named "mobility index") to compute the number of DOF of a mechanism. Noting $n_b$ the number of bodies and $n_j$ the number of joints, let n be the sum of DOF of joints, each one considered independently. Then, the Kutzbach-Grubler criterion computes the so called mobility index $\delta$ of the mechanism by $\delta = n - g(n_j - n_b + 1)$ where g is the number of DOF of an unconstrained arbitrary body. For a planar or spherical mechanism, $g=3$. For a spatial mechanism, $g=6$. The mobility index may be computed by using a graph including $n_b$ nodes, respectively associated with rigid bodies, and $n_j$ arcs, respectively associated with joints. Each arc is labeled with respective joint's DOF, meaning that n is the sum of all labels.

FIG. 1 illustrates a planar mobile mechanism together with the labeled graph of bodies and joints. Clearly, $n_b = n_j = 4$, $g=3$, each joint is a planar rotation and features one DOF, so $n=4$ and $\delta = n - g(n_j - n_b + 1) = 4 - 3(4 - 4 + 1) = 1$ as expected.

FIG. 2 illustrates a rigid assembly together with its labeled graph. Here, $n_b=5$, $n_j=6$, $g=3$, each joint features one DOF, so $n=6$ and $\delta=n-g(n_j-n_b+1)=6-3(6-5+1)=0$ as expected.

Unfortunately, the Kutzbach-Grubler criterion is known to be questionable in many real-world situations, and particularly in the context of the present disclosure. The drawback is illustrated in FIG. 3. The mechanism features the same arrangement of bodies and joints (but not the same dimensions) as the one in FIG. 2, and so $\delta=0$, despite it is mobile (the example is chosen so that mobility is intuitively obvious).

The state of the art definition of an over-constrained mobile mechanism is as follows. A mobile mechanism is over-constrained if its corresponding Kutzbach-Grubler index $\delta$ is non positive: $\delta \leq 0$. The mobility of an over-constrained mechanism is effective when a special relationship is realized. This relationship involves dimensions of bodies into an algebraic formula and is named the "mobility condition". For example, the previous five bars planar mechanism is mobile if and only if $l_2=l_4=l_5$ and $l_1=l_3$.

A typical class of over-constrained mobile spatial mechanisms is made of a loops of bodies connected by revolute joints. Each body is dimensioned by bar length $l$ and angle $\alpha$ between revolute axes, as illustrated in FIG. 4.

These mechanisms are named 4R, 5R, 6R, 7R, etc. depending on the number of bodies in the loop, as illustrated in FIG. 5. Letter "R" means that bars are connected through revolute joints.

A loop made of two or three bodies is definitely rigid. Conversely, a loop made of four, five or six bodies is generally rigid, but it can be mobile when some specific mobility condition is realized. For example, the mobility condition of the 4R mechanism is:

$$l_1=l_3$$

$$l_2=l_4$$

$$\alpha_1=\alpha_3$$

$$\alpha_2=\alpha_4$$

$$l_2 \sin \alpha_3 + l_3 \sin \alpha_2 = 0$$

where $l_i$ and $\alpha_i$ for $i=1, \ldots, 4$ are the respective bodies dimensions. Finally, loops made of at least seven bodies, 7R, 8R, etc. are always mobile.

The next table gathers these results:

| $n_b$ | $\delta$ | Ordinary behavior | Specific behavior | Academic wording | Discoverer |
|---|---|---|---|---|---|
| 3 | −3 | Rigid | — | — | — |
| 4 | −2 | Rigid | Over-constrained mobile | 4R | Bennett |
| 5 | −1 | Rigid | Over-constrained mobile | 5R | Goldberg |
| 6 | 0 | Rigid | Over-constrained mobile | 6R | Bricard |
| 7 | 1 | Mobile | — | 7R | — |
| n > 7 | n − 6 | Mobile | — | nR | — |

A fundamental drawback is that the mobility condition is generally out of reach. It is known for very particular over-constrained mechanisms (Bennett 4R, Goldberg 5R, Bricard 6R) after many years of research within the theory of mechanism community. But, according to document [4], the mobility condition cannot be obtained by an efficient algorithm. This makes an over-constrained mobile mechanism impossible to create and impossible to edit within a time frame compatible with a CAD system.

The consequence is that, nowadays, only a small number of over-constrained mechanisms contribute to industry because their design is very difficult. Most designers are unaware of the existence of over-constrained mechanisms and their properties. Sometimes, engineers may work on a mechanism without knowing it is over-constrained. Since the over-constrained mechanism being designed behaves like a rigid structure, engineers get the appropriate motion by adding at least one mechanical body and one mechanical joint. This is the most straightforward way, according to industrial experience, to design a mobile mechanism from a rigid one. However, this operation leads to three drawbacks. The first one is the additional manufacturing cost due to the number of bodies and joints. The second one is additional parameters to be controlled. The third one is the additional shipment cost due to the number of bodies. Conversely, an over-constrained mobile mechanism would fulfil the same function with fewer bodies and fewer joints, thus reducing cost.

For example, FIG. 6 illustrates a platform based on a 6R over-constrained mobile mechanism. The corresponding iso-constrained platform shown on FIG. 7 is based on six actuators. The 6R platform involves about six bodies, while the actuator platform involves about twelves bodies. Another industrial application of over-constrained mobile mechanism is an industrial shaker-mixer based on a spatial 6R over-constrained mechanism, as illustrated in FIG. 8.

Industrial domains where over-constrained mobile mechanisms are helpful include manipulator robots and networks of planar mechanisms. Indeed, manipulator robots require controlled axes and work with a large number of DOF, which results in expensive machines. Moreover, this flexibility may not always be necessary for a given task. As a network of planar mechanisms, a planar mechanism unit may need more links to achieve the same motion, compared to a single over-constrained mechanism. Therefore, if these over-constrained mechanisms are created simply and quickly, then more industrial applications could take benefit of simpler mechanisms for the same function. Documents [8-13] refer to these topics.

Within this context, there is still a need for an improved solution for designing a mechanism comprising rigid bodies and mechanical joints.

SUMMARY

It is therefore proposed a computer-implemented method for designing a mechanism comprising rigid bodies and mechanical joints. The mechanism has parameters which include dimensional parameters and positional parameters. The mechanism also has a closure equation which involves parameter values. The method comprises providing input parameter values. The input parameter values represent the mechanism in an input state. The input parameter values include input dimensional values. The method also comprises determining output parameter values. The output parameter values represent the mechanism in an output state. The output parameter values include output dimensional values. The determining comprises minimizing an objective function under constraints. The objective function penalizes a distance between the output dimensional values and the input dimensional values. The constraints include a first constraint representing verification of the closure equation by the output parameter values. The constraints further include a second constraint representing mobility of the mechanism in the output state.

The method may comprise one or more of the following:
the second constraint is an equality constraint representing a second order mobility of the mechanism in the output state;
the objective function is differentiable, and the minimizing comprises finding a zero of a Lagrange mapping derivative, the Lagrange mapping derivative being based on an insertion of the constraints in the objective function with Lagrange multipliers;
the objective function is twice differentiable, and the finding comprise integrating, starting from a point corresponding to the input state, a differential equation corresponding to a vector field, each stable equilibrium point of the vector field being a zero of the Lagrange mapping derivative;
the differential equation is of the type $$\begin{pmatrix} x' \\ \lambda' \end{pmatrix} = -L''(x, \lambda)^T L'(x, \lambda)$$

where L denotes the Lagrange mapping, x denotes unknowns of the minimization, and $\lambda$ denotes the Lagrange multipliers;
the equality constraint is of the type:

$$F(u, p) = 0$$
$$F_p(u, p)v = 0$$
$$F_p(u, p)vv + F_{pp}(u, p)w = 0$$
$$\|v\|^2 - 1 = 0$$
$$\langle v, w \rangle = 0$$

where:
F denotes the closure equation,
u denotes the dimensional values of the mechanism,
p denotes the positional values of the mechanism,
v denotes tangents of a trajectory of the mechanism, and
w denotes curvatures of the trajectory.
the constraints further include a third constraint representing rigid joint absence;
wherein the third constraint is of the type:

$$\beta \left( \prod_{i=1}^{n} v_i \right) \left( \prod_{i=1}^{m} u_i \right) - 1 = 0$$

where:
$\beta$ denotes a scalar,
$v_i$ denotes coordinate i of v, and
$u_i$ denotes coordinate i of u; and/or
the constraints further include a fourth constraint representing non-degeneration of the mechanism in the output state.

It is further provided a computer program comprising instructions for performing the method.

It is further provided a computer readable storage medium having recorded thereon the computer program.

It is further provided a system comprising a processor coupled to a memory and a graphical user interface, the memory having recorded thereon the computer program.

BRIEF DESCRIPTION OF THE DRAWINGS

Embodiments will now be described, by way of non-limiting example, and in reference to the accompanying drawings, where:
FIGS. 22, 23, 24, 25, 26, 27, 28 and 29 illustrate the method.

DETAILED DESCRIPTION

Figure 1:
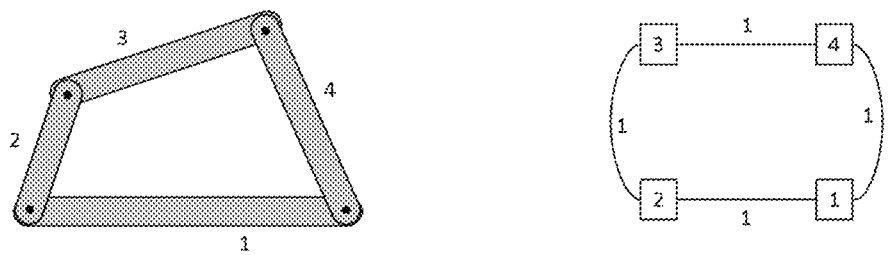
FIGS. 1, 2, 3, 4 and 5 illustrate concepts related to mechanism design.

A computer-implemented method for designing a mechanism comprising rigid bodies and mechanical joints is described. The mechanism has parameters which include dimensional parameters and positional parameters. The mechanism also has a closure equation which involves parameter values. The method comprises providing input parameter values. The input parameter values represent the mechanism in an input state. The input parameter values include input dimensional values. The method also comprises determining output parameter values. The output parameter values represent the mechanism in an output state. The output parameter values include output dimensional values. The determining comprises minimizing an objective function under constraints. The objective function penalizes a distance between the output dimensional values and the input dimensional values. The constraints include a first constraint representing verification of the closure equation by the output parameter values. The constraints further include a second constraint representing mobility of the mechanism in the output state.

Such a method forms an improved solution for designing a mechanism comprising rigid bodies and mechanical joints.

Notably, the method determines output parameter values from input parameter values. The method thus allows putting the mechanism in an output state starting from an input state. This change of state forms a design step of the mechanism. This design step is executed by an optimization program, namely the minimizing of the objective function under the constraints. This allows efficiency of the method.

Now, the first constraint ensures that the parameter values resulting from the optimization verify the closure equation. As a result, the mechanism as designed by the method is in an output state where it is closed, in other words, assembled. Since a mechanism is meant to be assembled to be used, the first constraint allows going toward an industrially relevant design of the mechanism.

In addition, the second constraint ensures that the parameter values resulting from the optimization represent a mechanism which presents mobility. Since a mechanism is meant to be mobile in order to function (as opposed to rigid), the second constraint allows going toward an industrially relevant design of the mechanism. The mechanism may notably verify the mobility condition in the output state. In other words, the mechanism designed by the method may be a mobile mechanism.

Together, the first and second constraints may thus allow obtaining a functioning mobile mechanism. The design outputted by the method may thus be used for simulation purposes, and/or for manufacturing a corresponding physical mechanism in the real world.

Throughout the disclosed method, the mechanism may comprise the same combination of rigid bodies and the same combination of mechanical joints, all in the same arrangement (said arrangement referring to which rigid bodies are connected together and by which one of the mechanical joints). Only parameter values of the mechanism may vary, in other words dimensions and/or positions of the mechanism's elements. In other terms, from the input state to the output state, the types of rigid bodies and mechanical joints forming the mechanism all remain the same and they all stay in the same arrangement, but the set of output parameter values may be different from the set of input parameter values. After the method however, the mechanism may be further modified in any manner, for example by adding and/or replacing a rigid body. Such post-processing modification is out of the scope of the present disclosure.

Figure 2:
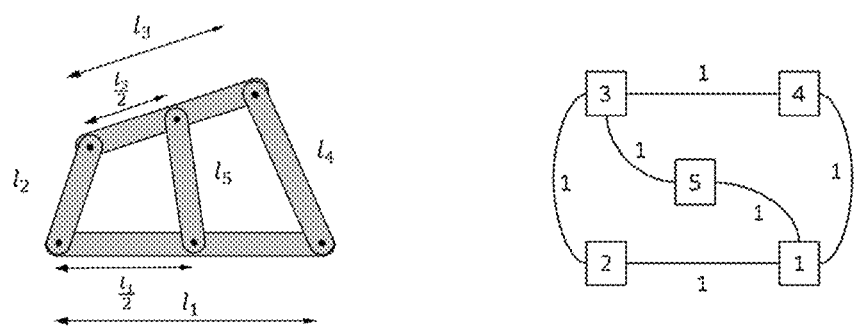
Figure 3:
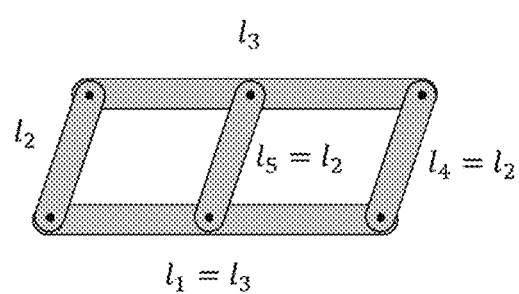
Figure 4:
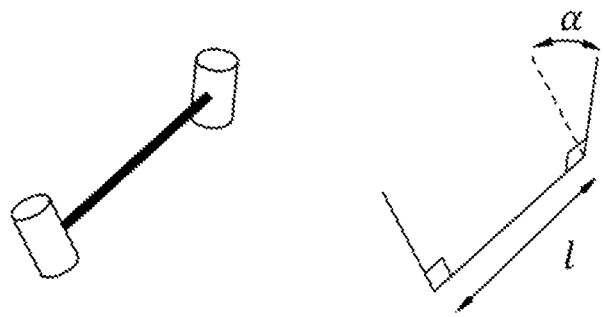
Figure 5:
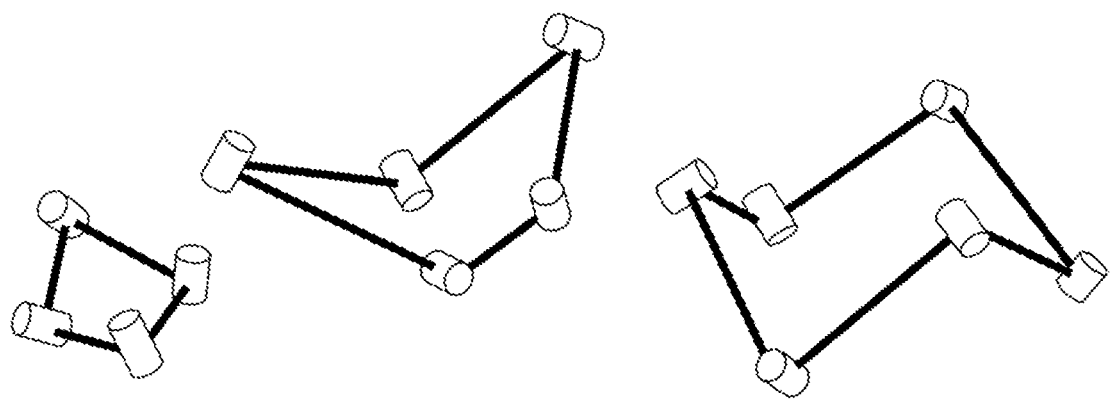
Figure 6:
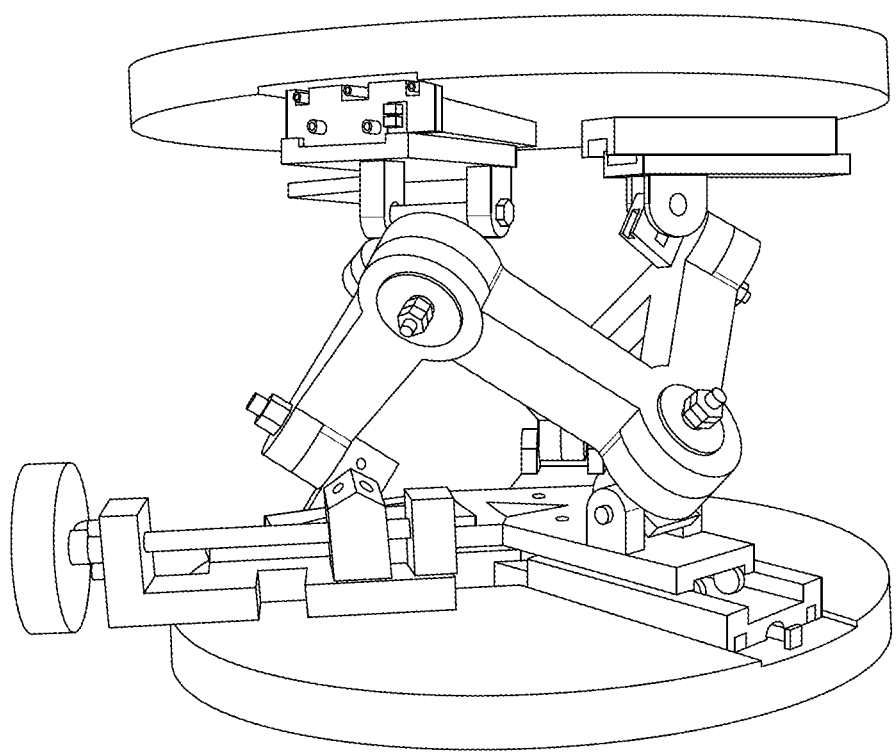
FIGS. 6, 7 and 8 show pictures of examples of mobile mechanisms.
Figure 7:
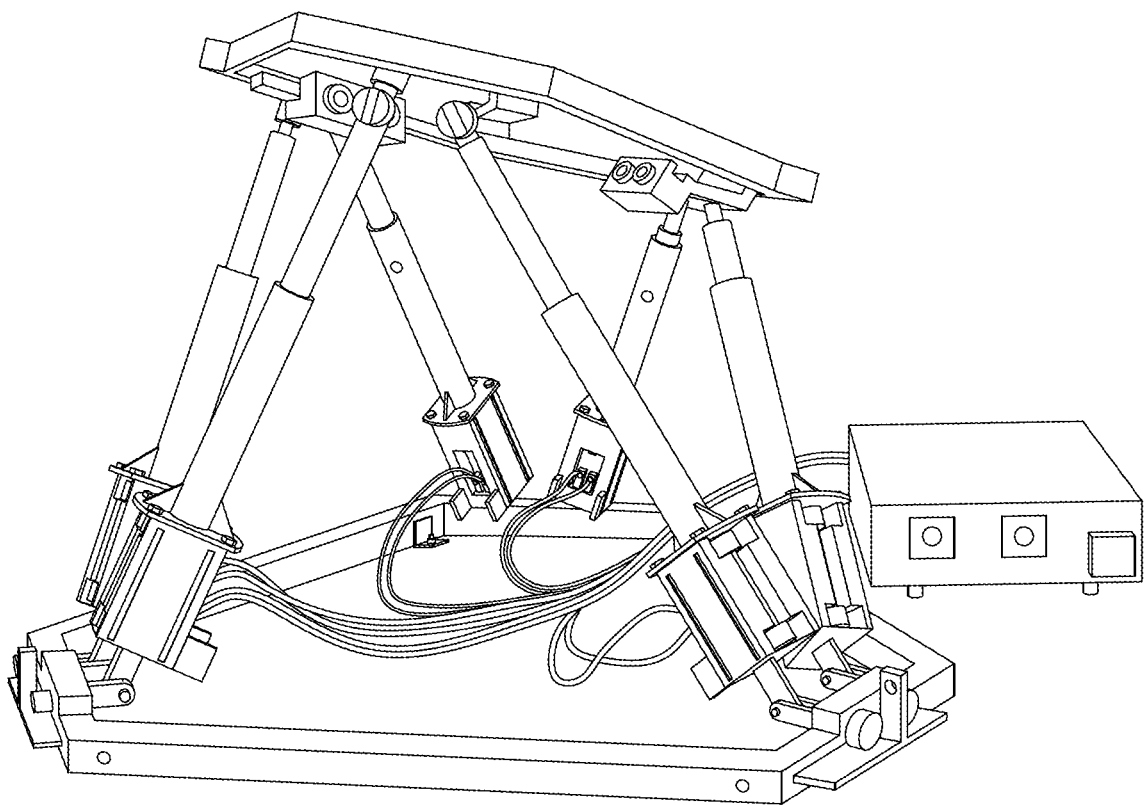
Figure 8:
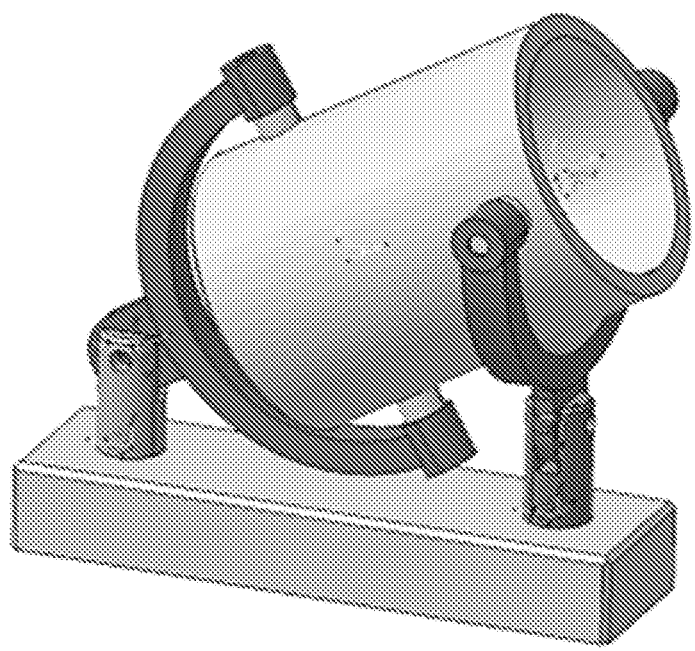

By "states" of the mechanism, it is hereby referred to the different configurations that the mechanism can take with different values of the parameters. For example, FIG. 2 and FIG. 3 show the same mechanism but in different states due to different dimensions of the rigid bars. On the contrary, FIG. 1 shows a different mechanism from FIG. 2 and FIG. 3, since the mechanism of FIG. 1 only has four bars instead of five. And FIG. 5 represents three different mechanisms from the left to the right: 4R, 5R, and 6R. For the sake of completeness, it is here noted that the term "state" in the present disclosure does not refer to the different positions that a mobile mechanism can take, but rather, as explained, to different instances of a same type/class of mobile mechanisms.

Thus, the method only processes parameter values of the mechanism, based notably on the closure equation of the mechanism. The parameter values of the mechanism may indeed be included among the free variables/unknowns of the minimization. The minimization thus edits dimensional parameter values and/or positional parameter values of the mechanism, so as to put the mechanism in an assembled and mobile state.

The closure equation of the mechanism is by definition an equation that takes all the parameters of the mechanism as arguments, and it is such that the mechanism is assembled/closed when the parameter values verify the equation. The closure equation may be provided in any way and may for example be predetermined to the method. The closure equation may for example be obtained from a library of closure equations each provided for a given type of mechanisms. Alternatively, the closure equation may be established by a user prior to the method, in any known way. For the sake of completeness, it is here noted that the mathematics that allow establishing the closure equation of any given mechanism are known per se (an example implementation is provided later).

The mechanism may be over-constrained, in the meaning provided earlier. In such a case, user-editions are difficult, but the method provides an automatic way of reaching an industrial and functional design.

In first applications of the method (where the mechanism may be over-constrained or not), the mechanism may be disassembled in the input state (i.e. not closed, or open), and the method allows assembling it by editing the dimensional and/or positional parameters. The mechanism may be disassembled in the input state because the input parameter values do not verify the closure equation. This may be because the input parameter values comprise input positional values which, together with the input dimensional parameter values, represent the mechanism in a disassembled state, by way of geometry. Such a situation may arise because the input dimensional values do not physically enable assembly of the mechanism at all, or because the input dimensional values physically enable assembly of the mechanism, but the input positional values do not achieve such assembly. This may alternatively be because the input parameter values lack values for some of the parameters, for example because they do not even comprise input positional values.

In second applications of the method (where the mechanism may be over-constrained or not), the mechanism may be assembled but rigid in the input state, and the method allows making it mobile by editing the dimensional and/or positional parameters. The mechanism may be assembled but rigid in the input state because, although the mechanism is assembled, the input dimensional parameter values do not allow for any mobility of the mechanism. This is for example the situation of the mechanism shown on FIG. 2 which is in a rigid state, as opposed to FIG. 3 which shows the same mechanism in a mobile state.

In third applications of the method (where the mechanism may be over-constrained or not), the mechanism may in the input state be disassembled but able to be assembled by mere re-positioning, and the method allows assembling it by editing the dimensional and/or positional parameters. In such a case, the input dimensional values may be such that the mere re-positioning leads to a rigid assembly, and the method further allows not only assembling the mechanism but also making it mobile by editing the parameters (including the dimensional parameters).

In fourth applications of the method alternative or cumulative with the above applications, the method may be used to edit one or more parameter values of an existing mechanism, for example one or more dimensional values. A user may for example set one or more target dimensional parameter values, and the method may incorporate such target(s) to the optimization problem (this may be done simply by removing, from the minimization, the associated parameter values from the set of optimizable unknowns). The mechanism may notably be over-constrained and/or mobile in the input state, and possibly assembled. In such a case, the method allows changing parameter values while maintaining the mobility of the mechanism. In implementations of such applications, the mechanism may be in the input state either as rigid and optionally associated with a target dimensional value or over-constrained, mobile, and mandatorily associated with a target dimensional value. In such fourth applications, the one or more target values may be limited to one target value, for example one target dimensional parameter value. This reduces risks of convergence toward a non-mobile solution (relative to several target dimensional parameter values).

The method may be embedded in a user-machine interaction. The user-machine interaction may comprise providing an arrangement of the rigid bodies and mechanical joints constitutive of the mechanism.

This may be performed for example by the user selecting types of rigid bodies and mechanical joints and instantiating them in the design. Graphical representations of the rigid bodies and/or of the mechanical joints may be displayed to the user. The user may define dimensional parameter values and/or positional parameter values. The positional parameter values may be defined for example with the use of graphical interactions of the user with the display, e.g. via a haptic device (such as a mouse or a touch device, e.g. a touchpad or a touchscreen). The graphical interaction may comprise drag-and-dropping a graphical representation of a rigid body and/or mechanical joint to a certain location of the display. In this manner, the user may define the input state of the mechanism, which provides the input parameter values to the minimization. Due to this user-machine interaction, notably with an over-constrained mechanism, the input state is almost necessarily a state in which the mechanism is either disassembled or assembled/able to be assembled but rigid. The user may notably assemble the mechanism but only approximately, for example as a result of the graphical interactions and the unavoidable inaccuracies thereof. Even if the user makes the effort of assembling the mechanism, if the mechanism is over-constrained, it will generally be very difficult for the user to edit the parameter values and find a mobile state. The method assists the user in doing that, and thereby improves ergonomics of mobile mechanism design.

This may be performed by the user calling an existing mobile mechanism, and requesting changes of said mechanism, for example by editing a dimensional parameter value. Graphical representations of the rigid bodies and/or of the mechanical joints of the mechanism may be displayed to the user. The edition of a dimensional parameter may be performed for example with the use of a graphical interaction of the user with the display, e.g. via a haptic device (such as a mouse or a touch device, e.g. a touchpad or a touchscreen). The graphical interaction may comprise drag-and-dropping an extremity of a graphical representation of a rigid body and/or a mechanical joint to a certain location of the display. The method allows maintaining mobility of the mechanism.

In all cases, the mechanism may be one for which the mobility condition is unknown in the prior art. When this mobility condition is unknown, its automatic computation is out of reach within a reasonable timeframe. The method may allow changing the dimension of a mobile mechanism while preserving mobility without the knowledge of the mobility condition, even if the mechanism is over-constrained. The method may alternatively or additionally allow changing a rigid structure into an over-constrained mobile mechanism without the knowledge of the mobility condition.

In practice, the input parameter values may comprise input positional values in addition to the input dimensional values. Additionally or alternatively, the output parameter values may comprise output positional values in addition to the output dimensional values.

In practice, the input parameter values may comprise a respective input positional value for each positional parameter and a respective input dimensional value for each dimensional parameter, and/or the output parameter values may comprise a respective output positional value for each positional parameter and a respective output dimensional value for each dimensional parameter. Optionally, one and only one target dimensional value may be further inputted to the minimization, as discussed above.

The objective function may be any cost penalizing a distance between the output dimensional values and the input dimensional values. For efficient implementations of the method, the objective function may be differentiable, or even twice differentiable. The objective function may for example be proportional to the square of the distance.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

The method generally manipulates modeled objects. A modeled object is any object defined by data stored e.g. in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

The 3D modeled object designed by the method may represent the geometry of a mobile mechanism to be manufactured in the real world subsequent to the completion of its virtual design with for instance a CAD software solution or CAD system.

The mobile mechanism may belong to (i.e. be used in) various and unlimited industrial fields, including: aerospace, architecture, construction, consumer goods, high-tech devices, industrial equipment, transportation, marine, and/or offshore oil/gas production or transportation.

The mobile mechanism is made of rigid bodies connected together by perfect mechanical joints, and it may feature any DOF.

The mechanical joints may be selected among any one of the following types of mechanical joints:
one DOF mechanical joints which include: revolute, screw, prismatic;
two DOF mechanical joints which include: cylindrical, spherical with pin;
three DOF mechanical joints which include: spherical, planar. The four DOF mechanical joints are: ball-cylinder, cylinder-plane;
five DOF mechanical joints which includes: ball-plane.

The rigid bodies may comprise (straight or non-straight) bars, or any rigid bodies that may be represented by segments. As known, CAD systems allowing mechanism design represent rigid bodies as segments defined between two mechanical joints.

The mobile mechanism may be over-constrained. The mobile mechanism may form or be a part of a manipulator robot, a network of planar mechanisms, an automotive mechanism, or any other type of mechanism presented herein (notably in the background section, including planar or non-planar loops of bodies connected by revolute joints).

Figure 9:
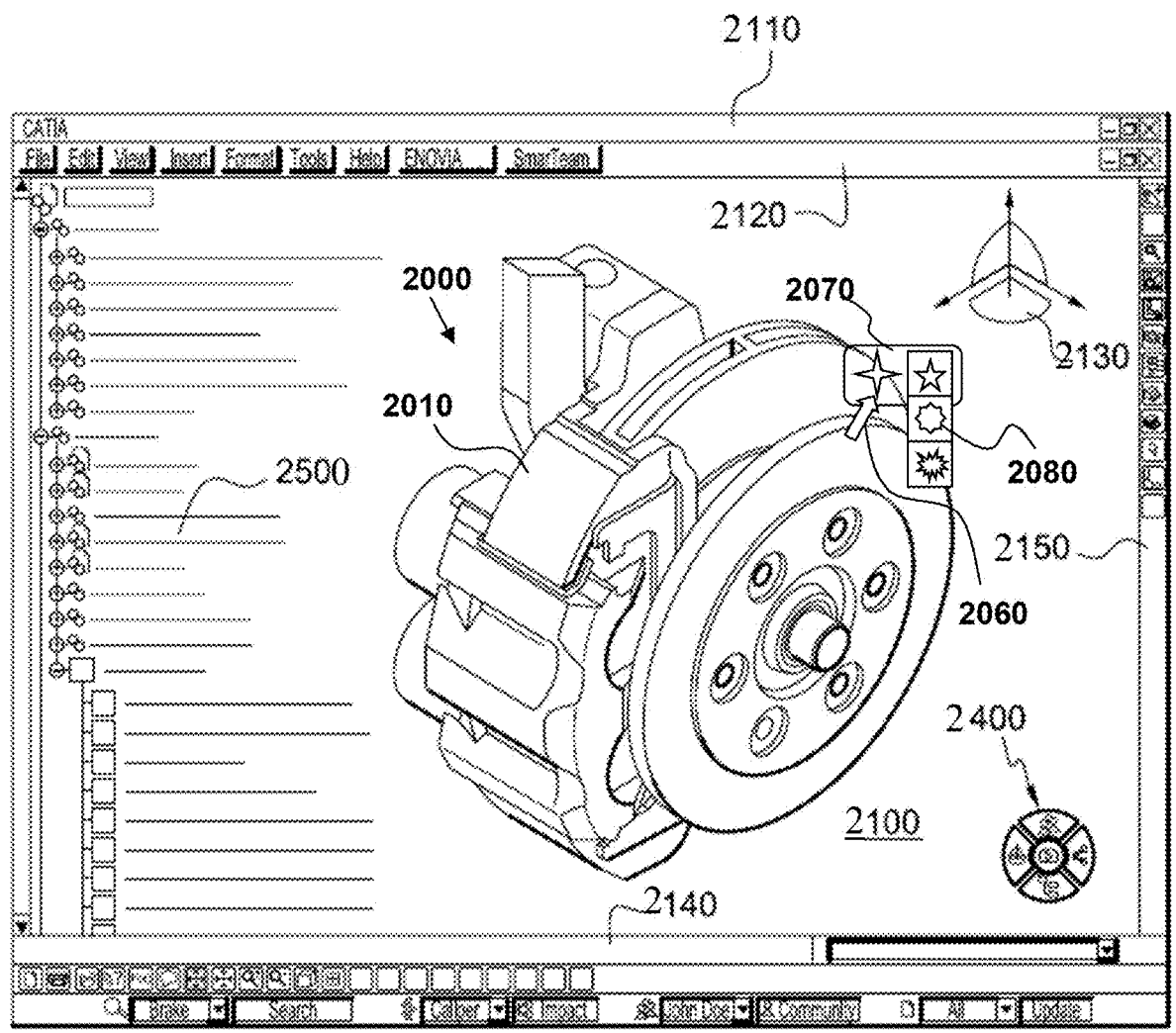
FIG. 9 shows an example of a graphical user interface of the system.

FIG. 9 shows an example of the GUI of the system, wherein the system is a CAD system. The 3D modeled object shown on FIG. 9 represents a mechanism: a disk brake having rotational mobility (the disk) and translational mobility (the brake pads).

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of the 3D modeled object displayed on the screen. The GUI may for example display data 2500 related to the displayed product 2000. In the example of the figure, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 10:
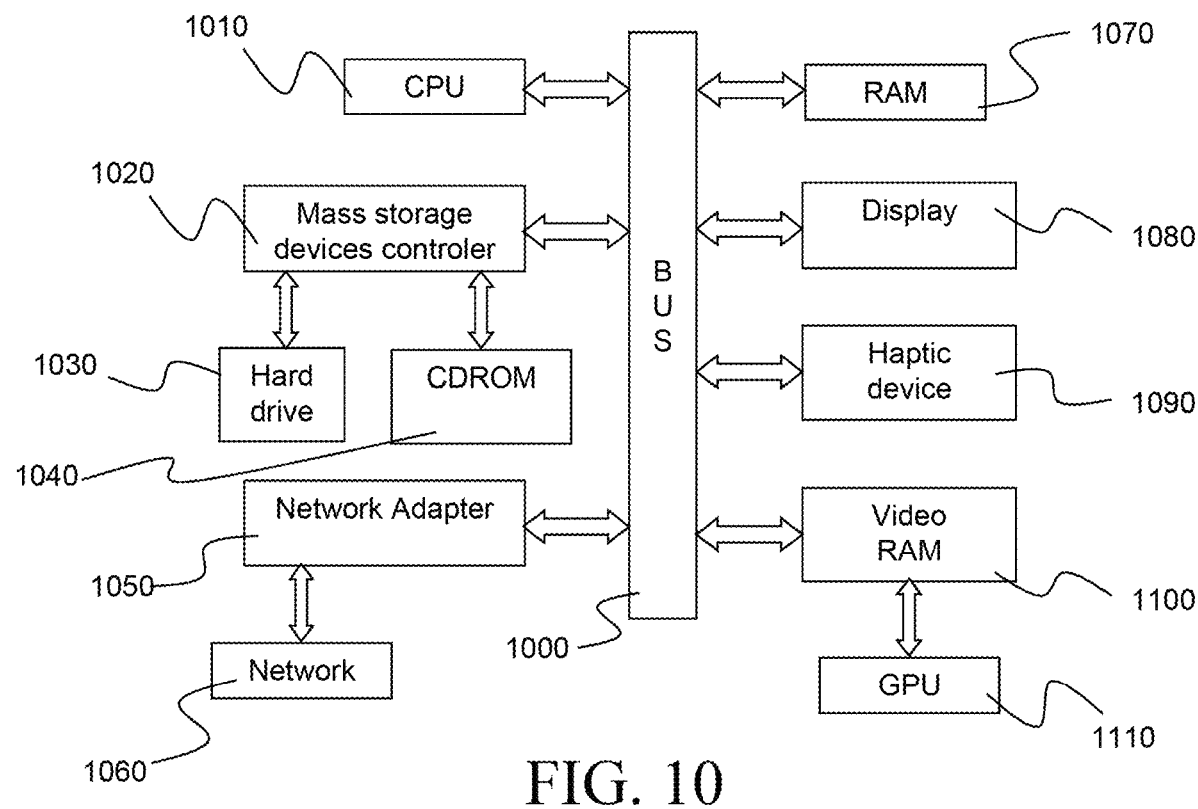
FIG. 10 shows an example of the system.
Figure 11:
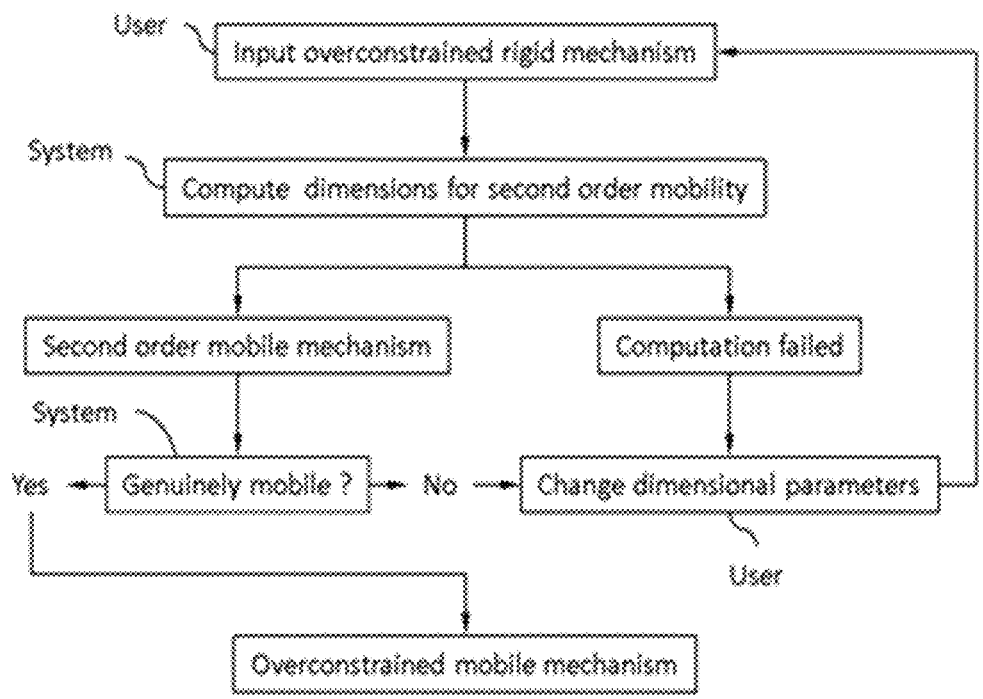
FIGS. 11, 12, 13, 14, 15, 16, 17, 18, 19, 20 and 21 illustrate the method.

FIG. 10 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

"Designing a 3D modeled object" designates any action or series of actions which is at least part of a process of elaborating a 3D modeled object. Thus, the method may comprise creating the 3D modeled object from scratch.

Alternatively, the method may comprise providing a 3D modeled object previously created, and then modifying the 3D modeled object.

The method may be included in a manufacturing process, which may comprise, after performing the method, producing a physical product corresponding to the modeled object. In any case, the modeled object designed by the method may represent a manufacturing object. The modeled object may thus be a modeled solid (i.e. a modeled object that represents a solid). The manufacturing object may be a product, such as a part, or an assembly of parts. Because the method improves the design of the modeled object, the method also improves the manufacturing of a product and thus increases productivity of the manufacturing process.

An implementation of the method is now discussed with reference to FIGS. 11-21.

Given an input over-constrained mechanism, the implementation of the method computes a similar mechanism that is mobile up to the second order. The principle is to project the dimensional parameters of the input mechanism onto the set of dimensional parameters of second order mobile mechanisms. Additional equations may be used to avoid rigid joints and vanishing dimensions. The projection problem is modeled by a quadratic optimization problem together with nonlinear constraints. Through classical Lagrange transformation, the optimization problem is changed into a root finding problem, which is then changed into an ordinary differential equation. The initial condition of the differential equation is the input mechanism. The unknown mechanism (mobile at second order) is a stable equilibrium point of the differential equation. This equilibrium point is obtained through a numerical integration of the differential equation from the initial condition, e.g. over a large enough time interval. The genuine mobility of the solution may be checked by using a standard kinematic solver. This is shown on FIG. 11.

Compared to state of the art technology, the implementation of the method is a practical solution that is able to create or modify a mobile over-constrained and non-degenerated mechanism. This makes the design of over-constrained mechanism accessible to engineers, which in turn opens the field of a new generation of advantageous mechanisms, as described previously.

The implementation of the method may allow two kinds of input. The first kind is a rigid over-constrained assembly, optionally associated with a target dimensional value. The second kind is an over-constrained mobile mechanism mandatorily associated with a target dimensional value. In all cases, the goal of the implementation of the method is to provide a mobile mechanism featuring the target dimensional value when it is given.

Mechanism Equation

From the mathematical point of view, the mechanism is modeled by the so-called closure mapping $F:U \times P \rightarrow E$ with $(u,p) \mapsto F(u,p)$ where U is the space of dimensional parameters, P is the space of positional parameters and E is the target space. The closure equation is $F(u,p)=0$. The solution $u_0,p_0$ is "genuinely mobile", or "mobile" for short, if $F(u_0, p_0)=0$ and if exists a smooth curve in the space of positional parameters $t \mapsto q(t)$ of a real parameter t such that $q(0)=p_0$, $q'(t) \neq 0$ for all t and $F(u_0,q(t))=0$ for all t. This level of abstraction is sufficient in the context of the implementation of the method.

Detailed Closure Equation

The closure equation captures topological and geometrical information through dedicated mathematical objects. Topology involves the logical connections of rigid bodies through mechanical joints. Geometry involves the dimensions of respective bodies as well as degrees of freedom of mechanical joints. Next sections describe the most general method to set up the closure equation of a mechanism. Particular methods can be used for particular mechanisms, such as document [15]. Tests performed in the context of the implementation of the method are based on equations of document [15], which can be adapted easily to 4R and 5R mechanisms.

Topology of the Mechanism

Formally, a mechanism Q may be defined by a tuple $Q=(H,B,q,J,D,C)$. Set $H=\{h_1, h_2, \ldots\}$ is a finite set. Elements of set H are called links. In practice, a link can be interpreted as an axis system and the goal is to define relative positions between links. Set $B=\{b_1, b_2, \ldots\}$ is also a finite set. Elements of set B are called bodies. Mapping $q:H \rightarrow B$ associates each link with a body in such a way that a body can own several links, but each link is associated with a unique body. Notation $q(h)=b$ means that link h is associated with body b. Notation $q^{-1}(b)$ is the set of links associated with body b. For each body b, one particular link is named the reference link and noted $h_0(b)$. In the following, the reference link is used for positioning other links of the same body. Now, the set J of joints is a subset of couples of links that belong to distinct bodies, that is $J \subset \{(h_i,h_k), i<k, q(h) \neq q(h_k)\}$. Each joint captures the logical connection between two links of distinct bodies. A this step, the graph G can be defined by $G=(B,J,s,e)$ with $s:J \rightarrow B$ and $e:J \rightarrow B$ where $s(h_i, h_k)=q(h_i)$ and $e(h_i,h_k)=q(h_k)$. The nodes of the graph are the bodies and the arcs of the graph are the joints connecting (links of) bodies. At this step, the topology of the mechanism is entirely defined.

Dimensional Parameters

The geometry is now defined by mappings D and C. The goal is to associate a relative position to couples of links in order to define the dimensions of respective bodies (through mapping D) as well as the degrees of freedom of joints (through mapping C). Dimensioning each body is done by considering the set of intra-body couples of links:

$$I = \bigcup_{b \in B} \{h_0(b)\} \times (q^{-1}(b) - \{h_0(b)\})$$

Noting SE(3) the group of three dimensional rigid motions, mapping $D:I \rightarrow SE(3)$ is such that, for each body b, and each non reference link h of body b, $D(h_0(b),h) \in SE(3)$ is the relative position of link h with respect to reference link $h_0(b)$. Each relative position is parameterized by angles and distances, and the set U of dimensional parameters of the mechanism is defined by all parameters of these relative positions.

Positional Parameters

Relative positions of bodies are defined by using mapping $C:J \rightarrow SE(3)$ with $(h_i,h_k) \mapsto D(h_i,h_k)$ associating a rigid motion $D(h_i,h_k)$ to each joint $(h_i,h_k)$. Parameters of each rigid motion define the degrees of freedom of each joint, and the set P of positional parameters of the mechanism is defined by all parameters of these relative positions. For clarity, $D(h_i,h_k)$ and $C(h_i,h_k)$ are respectively noted $D_{i,k}$ and $C_{i,k}$.

EXAMPLE

Figure 12:
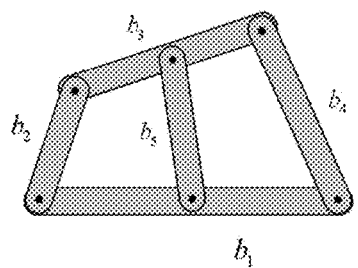

For example, the topology of the mechanism in FIG. 12 is defined by five bodies, twelve links and six joints, that is:

$$B = \{b_1, b_2, \ldots, b_5\}$$
$$H = \{h_1, h_2, \ldots, h_{12}\}$$

The bodies and links ownership is defined by mapping $q:H \to B$:

$$q(h_1) = q(h_2) = q(h_3) = b_1$$
$$q(h_4) = q(h_5) = b_2$$
$$q(h_6) = q(h_7) = q(h_8) = b_3$$
$$q(h_9) = q(h_{10}) = b_4$$
$$q(h_{11}) = q(h_{12}) = b_5$$

Reference links are as follows:

$$h_0(b_1) = h_1$$
$$h_0(b_2) = h_4$$
$$h_0(b_3) = h_6$$
$$h_0(b_4) = h_9$$
$$h_0(b_5) = h_{11}$$

Joints are:

$$J = \{(h_1,h_4),(h_5,h_6),(h_7,h_{11}),(h_8,h_9),(h_2,h_{12}),(h_3,h_{10})\}$$

Figure 13:
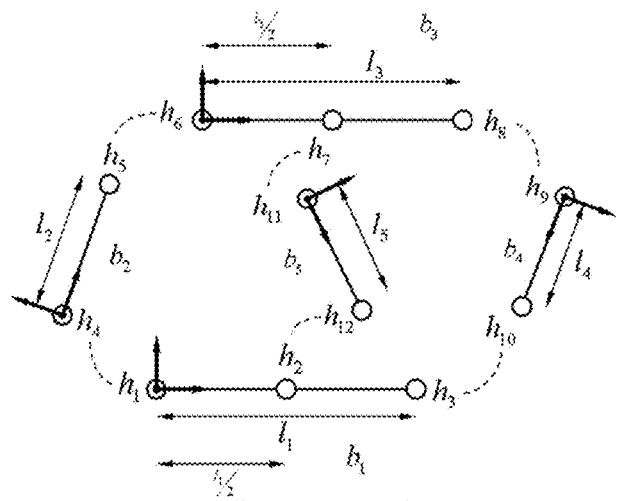

FIG. 13 illustrates the topology. An axis system is associated with each reference link. Dotted lines illustrate joints.

Relative positions are noted in such a way that dimensional and positional parameters explicitly occur in the argument. This helps clarifying the closure equation. Since the example is a planar mechanism, the set SE(2) of two dimensional rigid motions is used. Such a rigid motion is classically written $$\begin{pmatrix} \cos\theta & -\sin\theta & x \\ \sin\theta & \cos\theta & y \\ 0 & 0 & 1 \end{pmatrix}$$

where $\theta$ is the rotation angle and $\binom{x}{y}$ is the translation vector. Dimensions of body $b_1$ are defined by relative position of link $h_2$ with respect to reference link $h_1$, which is translation $$D_{1,2}(l_1) = \begin{pmatrix} 1 & 0 & \frac{l_1}{2} \\ 0 & 1 & 0 \\ 0 & 0 & 1 \end{pmatrix}$$

and by relative position of link $h_3$ with respect to reference link $h_1$, which is translation $$D_{1,3}(l_1) = \begin{pmatrix} 1 & 0 & l_1 \\ 0 & 1 & 0 \\ 0 & 0 & 1 \end{pmatrix}.$$

Dimension of body $b_2$ is defined by relative position of link $h_4$ with respect to reference link $h_3$, which is translation $$D_{4,5}(l_2) = \begin{pmatrix} 1 & 0 & l_2 \\ 0 & 1 & 0 \\ 0 & 0 & 1 \end{pmatrix}.$$

Dimensions of body $b_3$ are defined by relative position of link $h_7$ with respect to reference link $h_6$, which is translation $$D_{6,7}(l_3) = \begin{pmatrix} 1 & 0 & \frac{l_3}{2} \\ 0 & 1 & 0 \\ 0 & 0 & 1 \end{pmatrix}$$

and by relative position of link $h_8$ with respect to reference link $h_7$, which is translation $$D_{6,8}(l_3) = \begin{pmatrix} 1 & 0 & l_3 \\ 0 & 1 & 0 \\ 0 & 0 & 1 \end{pmatrix}.$$

Dimension of body $b_4$ is defined by relative position of link $h_{10}$ with respect to reference link $h_9$, which is translation $$D_{9,10}(l_4) = \begin{pmatrix} 1 & 0 & l_4 \\ 0 & 1 & 0 \\ 0 & 0 & 1 \end{pmatrix}.$$

Dimension of body $b_5$ is defined by relative position of link $h_{12}$ with respect to reference link $h_{11}$, which is translation $$D_{11,12}(l_5) = \begin{pmatrix} 1 & 0 & l_5 \\ 0 & 1 & 0 \\ 0 & 0 & 1 \end{pmatrix}.$$

In this example, each joint features a one DOF rotation, so all rigid motions $C_{i,k}$ are rotations:

$$C_{1,4}(\theta_1) = \begin{pmatrix} \cos\theta_1 & -\sin\alpha_1 & 0 \\ \sin\theta_1 & \cos\theta_1 & 0 \\ 0 & 0 & 1 \end{pmatrix}, C_{5,6}(\theta_2) = \begin{pmatrix} \cos\theta_2 & -\sin\theta_2 & 0 \\ \sin\theta_2 & \cos\theta_2 & 0 \\ 0 & 0 & 1 \end{pmatrix},$$

$$C_{7,11}(\theta_3) = \begin{pmatrix} \cos\theta_3 & -\sin\theta_3 & 0 \\ \sin_1\theta_3 & \cos\theta_3 & 0 \\ 0 & 0 & 1 \end{pmatrix}, C_{8,9}(\theta_4) = \begin{pmatrix} \cos\theta_4 & -\sin\theta_4 & 0 \\ \sin\theta_4 & \cos\theta_4 & 0 \\ 0 & 0 & 1 \end{pmatrix},$$

$$C_{2,12}(\theta_5) = \begin{pmatrix} \cos\theta_5 & -\sin\theta_5 & 0 \\ \sin\theta_5 & \cos\theta_5 & 0 \\ 0 & 0 & 1 \end{pmatrix} \text{ and } c_{3,10}(\theta_6) = \begin{pmatrix} \cos\theta_6 & -\sin\theta_6 & 0 \\ \sin\theta_6 & \cos\theta_6 & 0 \\ 0 & 0 & 1 \end{pmatrix}.$$

Figure 14:
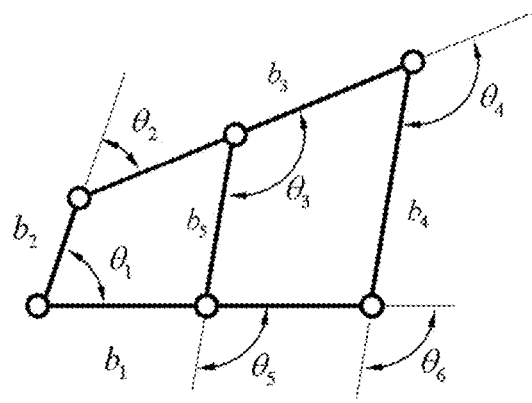

This is illustrated on FIG. 14.

Figure 15:
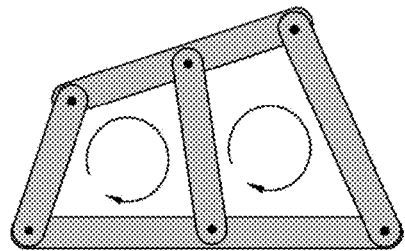

Everything is ready for the closure equation. It is written by combining the relative positions in order to close the two loops of the mechanism, as illustrated by FIG. 15.

First equation is built according to the leftmost loop, second equation is built according to the rightmost loop.

$$C_{1,4}(\theta_1)D_{4,5}(l_2)C_{5,6}(\theta_2)D_{6,7}(l_3)C_{7,11}(\theta_3)D_{11,12}(l_5)C_{2,12}(\theta_5)^{-1}D_{1,2}(l_1)^{-1} = I$$

$$C_{2,12}(\theta_5)D_{11,12}(l_5)^{-1}C_{7,11}(\theta_3)^{-1}D_{6,7}(l_3)^{-1}D_{6,8}(l_3)C_{8,9}(\theta_4)D_{9,10}(l_4)C_{3,10}(\theta_6)^{-1}D_{1,3}(l_1)^{-1}D_{1,2}(l_1) = I$$

This leads to six independent scalar equations:

$$\cos(\theta_1 + \theta_2 + \theta_3 - \theta_5) - 1 = 0$$

$$l_2\cos\theta_1 + \frac{1}{2}l_3\cos(\theta_1 + \theta_2) + l_5\cos(\theta_1 + \theta_2 + \theta_3) - \frac{1}{2}l_1\cos(\theta_1 + \theta_2 + \theta_3 - \theta_5) = 0$$

$$l_2\sin\theta_1 + \frac{1}{2}l_3\sin(\theta_1 + \theta_2) + l_5\sin(\theta_1 + \theta_2 + \theta_3) - \frac{1}{2}l_1\sin(\theta_1 + \theta_2 + \theta_3 - \theta_5) = 0$$

$$\cos(\theta_3 - \theta_4 - \theta_5 + \theta_6) - 1 = 0$$

$$l_3\cos(\theta_3 - \theta_5) + 2l_4\cos(\theta_3 - \theta_4 - \theta_5) - 2l_5\cos\theta_5 - l_1\cos(\theta_3 - \theta_4 - \theta_5 + \theta_6) = 0$$

$$l_3\sin(\theta_3 - \theta_5) + 2l_4\sin(\theta_3 - \theta_4 - \theta_5) + 2l_5\sin\theta_5 - l_1\sin(\theta_3 - \theta_4 - \theta_5 + \theta_6) = 0$$

Clearly, the overall dimensional parameter is $u=(l_1, \ldots, l_5)$ and positional parameter is $p=(\theta_1, \ldots, \theta_6)$.

Figure 16:
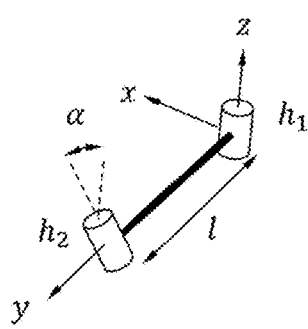

Another example is the dimensioning of the typical bar involved in nR mechanisms. It is made of two links $h_1$ and $h_2$, as illustrated in FIG. 16.

Taking $h_1$ as the reference link, the relative position of $h_2$ with respect to $h_1$ is the rigid motion $D_{1,2}(\alpha,l)$ combining a rotation by angle $\alpha$ and a translation by length $l$ along the rotation axis:

$$D_{1,2}(\alpha, l) = \begin{pmatrix} \cos\alpha & 0 & \sin\alpha & 0 \\ 0 & 1 & 0 & l \\ -\sin\alpha & 0 & \cos\alpha & 0 \\ 0 & 0 & 0 & 1 \end{pmatrix}$$

Mathematical Preliminary: Projection onto a Subset

This section recaps mathematical concepts operated by the implementation of the method. Let $x_0 \in \mathbb{R}^n$ be a given point. Let M be a subset of $\mathbb{R}^n$ defined by an implicit equation $M=\{x \in \mathbb{R}^n, c(x)=0\}$ where $c: \mathbb{R}^n \to \mathbb{R}^m$ is a smooth and possibly nonlinear mapping with m<n. The goal is to compute point $x^* \in M$ that is as close as possible to $x_0$.

Minimization

Classically, the problem is formulated as a quadratic minimization problem under nonlinear constraints, that is:

$$\min_{c(x)=0} \frac{1}{2}\|x - x_0\|^2$$

Despite many existing numerical algorithms can tackle this problem, the implementation of the method sets up a dedicated method because experiments show that standard methods are not efficient in the context of mobility computation. The first step is to formulate a root finding problem.

Root Finding

As can be seen, the specific objective function used in this implementation is differentiable (other objective functions could be used featuring the same characteristic). This allows the method to perform the minimizing such that it comprises finding a zero of a Lagrange mapping derivative. The Lagrange mapping derivative is based on an insertion of the constraints in the objective function with Lagrange multipliers. This approach allows an efficient minimization.

By introducing the Lagrange multiplier $\lambda \in \mathbb{R}^m$ and Lagrange mapping:

$$L(x, \lambda) = \frac{1}{2}\|x - x_0\|^2 + \langle \lambda | c(x) \rangle$$

It is well known that a solution of the minimization problem is necessarily a zero of Lagrange mapping derivative, that is:

$$L_x(x, \lambda) = 0$$

$$L_\lambda(x, \lambda) = 0$$

which is to find a zero of mapping $$(x, \lambda) \mapsto \begin{pmatrix} L_x(x, \lambda) \\ L_\lambda(x, \lambda) \end{pmatrix},$$

also named a root finding problem.

In addition, it can be proven that if $x \in \mathbb{R}^n$ is such that the linear mapping $c'(x): \mathbb{R}^n \to \mathbb{R}^m$ is not full rank, then the linear mapping $L''(x,\lambda): \mathbb{R}^{n+m} \to \mathbb{R}^{n+m}$ is not invertible. This makes the root computation problematic, which is the cause of the singularity detailed in the following.

Differential Equation

As can be seen, the specific objective function used in this implementation is actually twice differentiable (other objective functions could be used featuring the same characteristic). This allows the method to perform the finding in such a way that it simply comprises integrating a differential equation, starting from a point corresponding to the input state (removing the parameter value corresponding to the optional target dimensional value). This differential equation corresponds to a vector field and eventually represents a flow toward the second order mobility. Each stable equilibrium point of the vector field being a zero of the Lagrange mapping derivative, the integration converges toward a minimum of the objective function that verifies the constraints.

Here again, experiments show that existing numerical algorithms solving a root finding problem are not efficient in the context of mobility computation. For readability, unknown $(x,\lambda)$ of the root finding problem is noted with a single symbol y because it is not useful to separate the original unknown x and the unknown Lagrange multiplier $\lambda$. Furthermore, the root finding problem is noted $f(y)=0$. It is well known that if $y^*$ is a stable equilibrium point of the vector field $y \mapsto -f'(y)^{-1} f(y)$, then it is a solution of the root finding problem, meaning that $f(y^*)=0$, So considering the ordinary differential equation, $$y'(t) = -f'(y(t))^{-1} f(y(t))$$
$$y(0) = y_0$$

This means that, given an appropriate initialization point $y_0$, the trajectory $t \mapsto y(t)$ is such that $y(0)=y_0$ and $y(t) \to y^*$ when $t \to +\infty$. This formulation is known as the "continuous Newton method".

Nevertheless, this strategy may be adapted because, in the context of mobility computation, the inverse $f'(y)^{-1}$ does not exist at $y=y^*$, as explained in the following. A solution is to replace the inverted linear mapping $f'(y)^{-1}$ by the transposed linear mapping $f'(y)^T$, meaning that the differential equation of interest is:

$$y'(t) = -f'(y(t))^T f(y(t))$$
$$y(0) = y_0$$

Here again, it can be proven that if $f(y^*)=0$ then $y^*$ is also a stable equilibrium point of the vector field $y \mapsto -f'(y)^T f(y)$. This means that under an appropriate initialization $y_0$, the trajectory $t \mapsto y(t)$ is such that $y(0)=y_0$ and $y(t) \to y^*$ when $t \to +\infty$.

A technical reason is as follows. Noting $g(y)=-f'(y)^T f(y)$ the vector field, $y^*$ is a stable equilibrium of vector field $g(\cdot)$ when the eigenvalues of the linear mapping $g'(y^*)$ are negative. Since $g'(y)=-f''(y)^T f(y)-f'(y)^T f'(y)$, then $g'(y^*)=-f(y^*)^T f'(y^*)$ which features the shape $-A^T A$ where $A=f'(y^*)$. Any eigen value $\mu$ of matrix $-A^T A$ is negative because, noting $v$ the normalized eigen vector associated with $\mu$, by definition $-A^T A v = \mu v$, then $-\langle A^T A v, v \rangle = \mu \|v\|^2$ and $-\langle Av, Av \rangle = \mu$, meaning that $\mu = -\|Av\|^2 \leq 0$.

Figure 17:
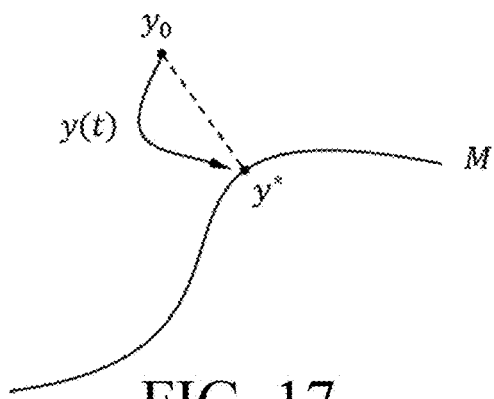

FIG. 17 illustrates the path followed by the trajectory $t \mapsto y(t)$ from initial point $y_0$ up to the solution $y^*$ which is the point of M closest to $y_0$.

Back to Lagrange notation $$y = \begin{pmatrix} x \\ \lambda \end{pmatrix} \text{ and } f = \begin{pmatrix} L_x \\ L_\lambda \end{pmatrix}$$

the differential equation is:

$$\begin{pmatrix} x' \\ \lambda' \end{pmatrix} = -\begin{pmatrix} L_{xx}(x,\lambda) & L_{x\lambda}(x,\lambda) \\ L_{x\lambda}(x,\lambda) & L_{\lambda\lambda}(x,\lambda) \end{pmatrix}^T \begin{pmatrix} L_x(x,\lambda) \\ L_\lambda(x,\lambda) \end{pmatrix}$$
$$x(0) = x_0$$
$$\lambda(0) = 0$$

And, expectantly, the trajectory is such that $x(t) \to x^*$ and $\lambda(t) \to \lambda^*$ where $L_x(x^*,\lambda^*)=0$, $L_\lambda(x^*,\lambda^*)=0$ and:

$$x^* = \underset{c(x)=0}{\operatorname{argmin}} \frac{1}{2} \|x - x_0\|^2$$

Simpler notation does not detail the partial derivatives:

$$L' = \begin{pmatrix} L_x \\ L_\lambda \end{pmatrix}, L'' = \begin{pmatrix} L_{xx} & L_{x\lambda} \\ L_{x\lambda} & L_{\lambda\lambda} \end{pmatrix}$$

and:

$$\begin{pmatrix} x' \\ \lambda' \end{pmatrix} = -L''(x,\lambda)^T L'(x,\lambda)$$
$$x(0) = x_0$$
$$\lambda(0) = 0$$

$\lambda(0)=0$ is an efficient example only (which has been tested), as other values of the Lagrange multipliers may be used for the starting point.

In practice, the input mechanism may be provided in the input state assembled or approximately assembled (e.g. the user having approximately assembled the mechanism, such that it topologically looks like the final intended design). This may define an appropriate starting point of the integration (for the $x_0$ part). In case in the method the input parameter values do not comprise a respective input value for each parameter, then these parameters may be initialized in any manner for the integration, for example by applying a heuristic that assembles or approximately assembles the mechanism (without making it mobile though).

Solving

The solving is a numerical integration of the differential equation $y'=-f'(y)^T f(y)$ over a time interval $[0,t_{max}]$ where $t_{max}$ is increased until $\|f(y(t_{max}))\|$ is smaller than a predefined threshold $\varepsilon>0$. The value of the differential equation is that the solving follows a unique path in the vector field defined by the initial condition $y_0$. No iterative algorithm, step size management, local minimum trap or the like, as it may happen with traditional numerical methods.

The initialization point $y_0$ may be in the basin of attraction of a stable equilibrium point. There may exist a point $\bar{y}$ such that $f'(\bar{y})^T f(\bar{y})=0$, meaning that $\bar{y}$ is an equilibrium point, but $f(\bar{y}) \neq 0$, meaning that $\bar{y}$ is not a solution of the root finding problem. The latter is caused by the transposition replacing the inversion. In practice, tests show that the method responds well to these matters.

Genuine Mobility Vs. Infinitesimal Mobility

The second constraint which ensures mobility is now discussed.

In this implementation of the method, it is simply an equality constraint representing a second order mobility of the mechanism in the output state. It has been identified that this constraint is in practice sufficient to ensure mobility of the mechanism. This allows practicability of the optimization.

In order to cope with the intrinsic difficulty of generating or saving the mobility of an over-constrained mechanism, as stated by document [4], the concept of infinitesimal mobility is proposed by document [6]. The principle is to consider the mapping $t \mapsto F(u,\varphi(t))$ where $t \mapsto \varphi(t)$ is a curve in the space of positional parameters. By definition, the solution $(u,p)$ features order n infinitesimal mobility if exists an arc $t \mapsto \varphi(t)$ such that $\varphi(0)=p$, $\varphi'(0) \neq 0$ and such that all successive derivative $$\frac{d^i}{dt^i}(F(u,\varphi(t)))$$

vanish at $t=0$ for $i=0,1,\ldots n$.

$$F(u, \varphi(0)) = 0$$

$$\left[\frac{d}{dt}(F(u, \varphi(t)))\right]_{t=0} = 0$$

$$\left[\frac{d^2}{dt^2}(F(u, \varphi(t)))\right]_{t=0} = 0$$

$$\vdots$$

$$\left[\frac{d^n}{dt^n}(F(u, \varphi(t)))\right]_{t=0} = 0$$

Figure 18:
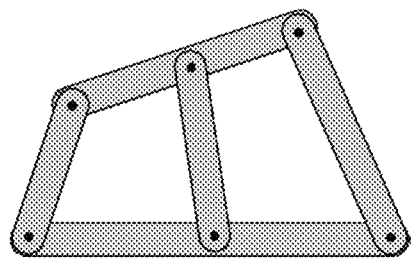
Figure 19:
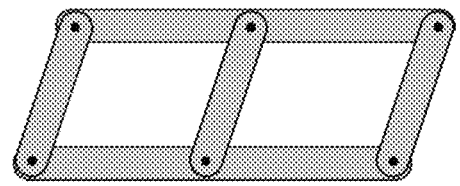

It is proven in document [6] that infinitesimal mobility at all orders is equivalent to genuine mobility. Infinitesimal mobility is a subtle concept. For example, FIG. 18 is a planar assembly that is rigid. FIG. 19 illustrates a genuinely mobile version of the planar mechanism, thanks to the mobility condition.

Figure 20:
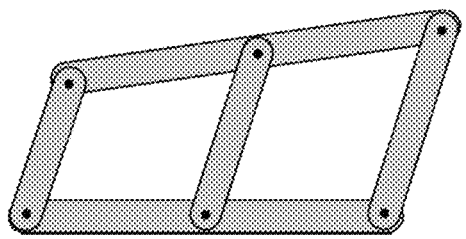
Figure 21:
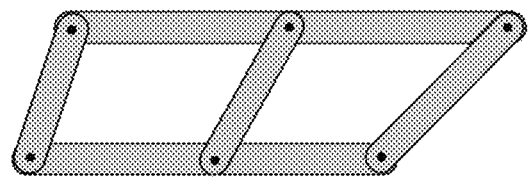

FIGS. 20 and 21 illustrate respectively two versions of the assembly that are mobile at first order, but not mobile at second order. Consequently, they are not genuinely mobile, and so they are rigid. In this example, the first order mobility is caused by parallel opposite rods.

During investigations and testing, inventors discovered a version of the 4R spatial assembly that is mobile at second order but not genuinely mobile.

Second Order Mobility Definition

It is proven in document [7] that an assembly able to reach a sufficiently large number of distinct positions is genuinely mobile. The implementation of the method is based on private experiments showing that second order mobility almost always provides genuine mobility, in the context of the proposed optimization. For a better conditioning of equations, it is convenient (but not restricting) to suppose that curve $\varphi(\cdot)$ is parameterized with curvilinear abscissa, that is $\|\varphi'(t)\|^2 = 1$ for all t. Using basic rules of differential calculus, for all t, $$\frac{d}{dt}(F(u, \varphi(t))) = F_p(u, \varphi(t))\varphi'(t)$$

And $$\frac{d^2}{dt^2}(F(u, \varphi(t))) = F_p(u, \varphi(t))\varphi'(t)\varphi'(t) + F_{pp}(u, \varphi(t))\phi''(t)$$

In addition, $$0 = \frac{d}{dt}\|\varphi'(t)\|^2 = 2\langle\varphi'(t), \varphi''(t)\rangle$$

This yields the second order mobility equations: if there exist $(u,p) \in U \times P$, $v \in P$ and $w \in P$ such that (and this may define the equality constraint, i.e. the second constraint of the proposed optimization program):

$$F(u, p) = 0$$

$$F_p(u, p)v = 0$$

$$F_p(u, p)vv + F_{pp}(u, p)w = 0$$

$$\|v\|^2 - 1 = 0$$

$$\langle v, w \rangle = 0$$

Then the mechanism defined by dimensional parameter u is mobile at second order. Indeed, by choosing $$\varphi(t) = p + tv + \frac{t^2}{2}w$$

it is not difficult to check that $F(u,\varphi(0))=0$, $$\left[\frac{d}{dt}(F(u_0, \varphi(t)))\right]_{t=0} = 0 \text{ and } \left[\frac{d^2}{dt^2}(F(u_0, \varphi(t)))\right]_{t=0} = 0$$

because, by design, $\varphi(0)=p$, $\varphi'(0)=v$ and $\varphi''(0)=w$.

The implementation of the method makes use of second order mobility as it is in practice sufficient and allows a relatively fast minimization, but it can be easily extended to any higher order of mobility.

Avoiding Rigid Joints

The constraints may include a third constraint which represents rigid joint absence.

A joint is rigid if, during the motion of the mobile mechanism, the two solids connected by this joint do not feature any relative motion. In other words, the two solids connected by a rigid join can be considered as a single rigid body. Such a behavior is rather to be avoided from the designer point of view, even if some mobility does exist elsewhere. Each joint should rather be active during the motion. The goal is now to set up an equation to avoid rigid joints. The mobility takes birth with the condition $\|v\|^2=1$, where v is the tangent vector to the hypothetical trajectory. This condition does not avoid rigid joints because some (but not all) coordinates of vector v may vanish despite $\|v\|$ does not. Noting $v=(v_1, \ldots, v_n)$ the coordinates of vector v and introducing a new scalar unknown $\beta$, the additional condition to eliminate rigid joints is:

$$\beta \prod_{i=1}^{n} v_i - 1 = 0$$

Avoiding Vanishing Dimensions

In addition, the constraints may include a fourth constraint which represents vanishing dimensions absence.

The output mechanism computed by the implementation of the method should rather not feature degenerated solids with vanishing dimensions. Noting $u=(u_1, \ldots, u_m)$ the coordinates of the dimensional parameter u, the previous non-rigid joints condition is reused to embed non-vanishing dimensions:

$$\beta\left(\prod_{i=1}^{n} v_i\right)\left(\prod_{i=1}^{m} u_i\right) - 1 = 0$$

Thus, the fourth constraint may be captured within the (same) constraint as the third constraint, which thus further represents non-degeneration of the mechanism in the output state. In other words, the third and fourth constraint are provided as a common (e.g. equality) constraint. Alternatively, the fourth constraint may be provided as a separate constraint from the third constraint in the optimization program.

Model for Non-Degenerated Second Order Mobility

For clarity, a single mapping M(u,p,v,w,β) captures second order mobility, non-rigid joints and non-vanishing dimensions condition $$M(u, p, v, w, \beta) = \begin{pmatrix} F(u, p) \\ F_p(u, p)v \\ F_p(u, p)vv + F_{pp}(u, p)w \\ \|v\|^2 - 1 \\ \langle v, w \rangle \\ \beta\left(\prod_{i=1}^{n} v_i\right)\left(\prod_{i=1}^{m} u_i\right) - 1 \end{pmatrix}$$

This way, the non-degenerate second order mobility is written M(u,p,v,w,β)=0. Given an input mechanism defined by dimensional parameter $u_0$ and positional parameter $p_0$, the problem is to find a dimensional parameter u that is as close as possible to $u_0$, and to find parameters p, v, w, and β such that:

$$\min_{M(u,p,v,w,\beta)=0} \frac{1}{2}\|u - u_0\|^2$$

As explained previously, the solving is a numerical integration of the differential equation associated with the minimization problem. Lagrangian mapping is:

$$L(u, p, v, w, \beta, \lambda) = \frac{1}{2}\|u - u_0\|^2 + \langle \lambda \mid M(u, p, v, w, \beta) \rangle$$

Thanks to the mathematics, the equation system defining a non-degenerated mechanism featuring second order mobility is:

L'(u,p,v,w,β,λ)=0

By definition, order n+1 mobility includes the derivatives of order n mobility equations. Consider a mechanism that is mobile at second order. If this mechanism is genuinely mobile, then it is infinitesimally mobile at all orders, and, in particular, it is mobile at third order. This makes the second order mobility equations ill-conditioned because their derivatives also vanish, which creates an inconsistency in the constraints of the minimization problem. The consequence is that the Lagrangian second derivative is not invertible when the mechanism is genuinely mobile.

Tests performed on numerous over-constrained mechanisms confirm the fact that linear mapping L"(u,p,v,w,β,λ) is not invertible. So, something may be done to replace the inversion by something more appropriate. The state of the art provides three kinds of methods to deal with a non-invertible matrix A. Firstly, when the number of rows is larger than the number of columns, the so called pseudo-inverse of matrix A is defined by $(A^TA)^{-1}A^T$. Secondly, when the number of rows is smaller than the number of columns, the so called pseudo-inverse of matrix A is $A^T(AA^T)^{-1}$. Thirdly, the most general method to deal with a non-invertible matrix is the singular value decomposition (SVD) method, which is a purely numerical method. The reasons why none of these methods fit the implementation of the method's need are now explained. Both pseudo-inverse methods require a substantial non-degeneracy condition, which is: either $A^TA$ or $AA^T$ should rather be invertible. In the context of the implementation of the method, this non-degeneracy condition is out of reach. In addition, SVD is a purely numerical and time consuming method, as opposed to the symbolic definition of pseudo-inverse. It cannot be used in the definition of a differential equation. The implementation of the method makes use of the transposition for the following reasons. It does not require any non-degeneracy condition because the transposed matrix always exists. The computing time is very small. As explained in the mathematical introduction, any solution of equation L'=0 is also a stable equilibrium of vector field $-(L")^TL'$.

Consequently, the inversion $L"(u,p,v,w,\beta,\lambda)^{-1}$ is advantageously replaced by the transposition $L"(u,p,v,w,\beta,\lambda)^T$ so that the differential equation is:

$$\begin{pmatrix} u' \\ p' \\ v' \\ w' \\ \beta' \\ \lambda' \end{pmatrix} = -L''(u, p, v, w, \beta, \lambda)^T L'(u, p, v, w, \beta, \lambda)$$

$u(0) = u_0$ $p(0) = p_0$ $v(0) = v_0$ $w(0) = w_0$ $\beta(0) = \beta_0$ $\lambda(0) = \lambda_0$ Setting Up the Initial Condition Setting the initial condition $u_0$, $p_0$, $v_0$, $w_0$, $\beta_0$, $\lambda_0$ determines the path of the trajectory in the vector field. Parameters $u_0$ and $p_0$ are given by the input mechanism, and may correspond to an assembled or substantially assembled state of the mechanism. Numerical tests show that $w_0=0$ and $\lambda_0=0$ are effective. Initial $v_0$ is computed in such a way that $\|v_0\|^2=1$ and that $\|F_p(u_0,p_0)v_0\|^2$ is minimum. This choice is driven by the target, which is to find, in particular, u, p, v such that $F_p(u,p)v=0$ and $\|v\|^2=1$. In addition, if, by chance, the input mechanism features first order mobility, then there exists a normalized $v_0$ such that $F_p(u_0,p_0)v_0=0$ and the initialization process naturally computes this particular $v_0$. Given a matrix A with more rows than columns, it is well known from optimization theory that normalized vector x minimizing $\|Ax\|^2$ is the normalized eigenvector of matrix $A^TA$ associated with its smallest eigenvalue, that is the smallest number μ such that $A^T Ax=\mu x$. Consequently, $v_0$ is the eigenvector of matrix $F_p(u_0,p_0)^TF_p(u_0,p_0)$ associated with its smallest eigenvalue. Finally, $\beta_0$ is computed so that:

$$\beta_0 \left(\prod_{\substack{i \\ v_{0_i} \neq 0}} v_{0_i}\right) \left(\prod_j u_{0_j}\right) = 1$$

Setting a Target Dimensional Value

As explained previously, in some circumstances, a target dimensional value can be set by the user. The goal of this section is to explain how this is implemented. The dimensions of the mechanism are captured through the vector variable u, which in fact is a list of scalar variables u=(u$^1$, u$^2$, ..., u$^n$) where each u$^i$ is a length or an angle. Setting a target dimensional value is to:
1. select the particular scalar parameter u$^k$ with k∈ {1, ..., n},
2. set a particular numerical value to scalar parameter u$^k$,
3. remove this parameter from the unknown vector u, so that it becomes $$(u^i)_{\substack{i=1,\ldots n \\ i \neq k}}$$

Steps 1 and 2 are done by the user. Step 3 is done by the system. So, when a target dimensional value is set, the implementation of the method deals with a reduced unknown vector u featuring one less unknown. This does not change the overall process and this is why, for readability, it is not captured in the earlier notations.

Examples of the implementation of the method are now discussed with reference to FIGS. 22-29. These examples were tested and the results are hereby provided.

Example 1: Changing a Rigid 4R Assembly into a Non-Degenerate 4R Mobile Mechanism This test case is a verification of the method, because the theoretical mobility condition of the 4R mechanism is known. Starting with the initial 4R rigid assembly u$_0$, the implementation of the method has computed the 4R mobile mechanism u$_1$ as follows:

$$u_0 = \begin{pmatrix} l_1^0 = 250 \\ l_2^0 = 200 \\ l_3^0 = 406.202 \\ l_4^0 = 269.258 \\ \alpha_1^0 = 53.1301 \\ \alpha_2^0 = -29.7449 \\ \alpha_3^0 = 35.8344 \\ \alpha_4^0 = -30.0396 \end{pmatrix}$$

$$u_1 = \begin{pmatrix} l_1^1 = 328.229 \\ l_2^1 = 234.45 \\ l_3^1 = 328.229 \\ l_4^1 = 234.45 \\ \alpha_1^1 = 44.4209 \\ \alpha_2^1 = -29.9965 \\ \alpha_3^1 = 44.4209 \\ \alpha_4^1 = -29.9965 \end{pmatrix}$$

Figure 22:
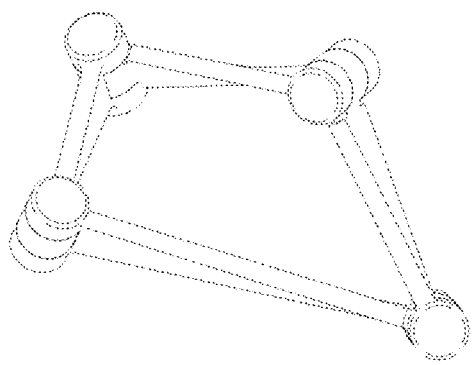
Figure 23:
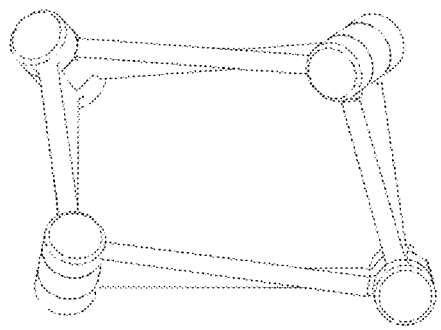

These input and output states are respectively illustrated in FIGS. 22-23.

The order of magnitude of second order mobility is M( . . . )≈10$^{-9}$ and the order of magnitude of mobility condition is 10$^{-8}$. The mobility of the resulting mechanism is confirmed by using the CATIA assembly design solver.

Example 2: Changing a Rigid 5R Assembly into a Non-Degenerate 5R Mobile Mechanism Starting with the initial 5R rigid assembly u$_0$, the implementation of the method has computed the 5R mobile mechanism u$_1$ as follows:

$$u_0 = \begin{pmatrix} l_1^0 = 100 \\ l_2^0 = 160 \\ l_3^0 = 200 \\ l_4^0 = 260 \\ l_5^0 = 215.93498916339018 \\ \alpha_1^0 = 23.5781785 \\ \alpha_2^0 = 39.7918195 \\ \alpha_3^0 = -53.1301024 \\ \alpha_4^0 = 63.369998 \\ \alpha_5^0 = -50 \end{pmatrix}$$

$$u_1 = \begin{pmatrix} l_1^1 = 101.097 \\ l_2^1 = 162.638 \\ l_3^1 = 204.234 \\ l_4^1 = 263.234 \\ l_5^1 = 23.0926 \\ \alpha_1^1 = 39.122 \\ \alpha_2^1 = 23.926 \\ \alpha_3^1 = -52.4059 \\ \alpha_4^1 = 62.2146 \\ \alpha_5^1 = -52.4059 \end{pmatrix}$$

These input and output states are respectively illustrated in FIGS. 24-25 (the left figure represents.

The order of magnitude of second order mobility is M( . . . )≈10$^{-16}$ and the order of magnitude of mobility condition is 10$^{-16}$. The mobility of the resulting mechanism is confirmed by using the CATIA assembly design solver.

Example 3: Changing a Rigid 6R Assembly into a Non-Degenerate 6R Mobile Mechanism This test case is to create a genuine mobile 6R while the mobility condition is unknown. Starting with the initial 6R rigid assembly u$_0$, the implementation of the method has computed the 6R mobile mechanism u$_1$ as follows:

$$u_0 = \begin{pmatrix} l_1^0 = 101.0 \\ l_2^0 = 0.80 \\ l_3^0 = 1100 \\ l_4^0 = 100.0 \\ l_5^0 = 80.0 \\ l_6^0 = 110.0 \\ \alpha_1^0 = 91.0 \\ \alpha_2^0 = -90.0 \\ \alpha_3^0 = 90.0 \\ \alpha_4^0 = -90.0 \\ \alpha_5^0 = 90.0 \\ \alpha_6^0 = -90.0 \end{pmatrix}$$

$$u_1 = \begin{pmatrix} l_1^1 = 105.5 \\ l_2^1 = 80.0 \\ l_3^1 = 105.0 \\ l_4^1 = 105.0 \\ l_5^1 = 80.0 \\ l_6^1 = 105.5 \\ \alpha_1^1 = 90.5 \\ \alpha_2^1 = -90.0 \\ \alpha_3^1 = 90.0 \\ \alpha_4^1 = -90.0 \\ \alpha_5^1 = -90.0 \\ \alpha_6^1 = -90.5 \end{pmatrix}$$

These input and output states are respectively illustrated in FIGS. 26-27

The order of magnitude of second order mobility is $M(\ldots) \approx 10^{-16}$. The mobility of the resulting mechanism is confirmed by using the CATIA assembly design solver.

Example 4: Changing a Rigid 4R1C Assembly into a Non-Degenerate Mobile Mechanism This example features four revolute joints (4R) and one cylindrical joint (1C). This test case is to create a genuine mobile 4R1C while the mobility condition is unknown. Starting with the initial 4R1C rigid assembly $u_0$, the implementation of the method has computed the 4R1C mobile mechanism $u_1$.

$$u_0 = \begin{pmatrix} l_1^0 = 90 \\ l_2^0 = 104 \\ l_3^0 = 76 \\ l_4^0 = 200 \\ l_5^0 = 80 \\ \alpha_1^0 = 12 \\ \alpha_2^0 = 8 \\ \alpha_3^0 = 0 \\ \alpha_4^0 = 19 \\ \alpha_5^0 = 0 \end{pmatrix}$$

$$u_1 = \begin{pmatrix} l_1^1 = 92.604588704090730289 \\ l_2^1 = 105.54102171867846493 \\ l_3^1 = 77.675481358154470968 \\ l_4^1 = 197.94136613235357913 \\ l_5^1 = 78.386288003840704164 \\ \alpha_1^1 = 9.4189920411221539354 \\ \alpha_2^1 = 10.041375133702796773 \\ \alpha_3^1 = 0.11073676901719473053 \\ \alpha_4^1 = 19.401544046719084946 \\ \alpha_5^1 = 0.14145126710320735097 \end{pmatrix}$$

These input and output states are respectively illustrated in FIGS. 28-29.

The invention claimed is:

1. A computer-implemented method for designing a mobile mechanism including rigid bodies and mechanical joints, the mechanism having parameters including dimensional parameters and positional parameters, the mechanism having a closure equation involving parameter values, the method comprising:
obtaining input parameter values from a user via a graphical user interface (GUI) representing an immobile mechanism in an input state defined by the user selecting graphical representations of the rigid bodies and mechanical joints, the input parameter values including input dimensional values of the selected rigid bodies and mechanical joints; and
determining output parameter values representing the mobile mechanism in an output state, the output parameter values including output dimensional values, the determining including minimizing an objective function under constraints, the objective function penalizing a distance between the output dimensional values and the input dimensional values, the constraints including a first constraint representing verification of the closure equation by the output parameter values, and a second constraint representing mobility of the mechanism in the output state,
wherein the determined output parameter values are applied in a manufacturing process of the mechanism such that the mechanism, in the output state, is closed and mobile, thereby increasing the productivity of the manufacturing process by increasing the speed of the designing by the user.

2. The method of claim 1, wherein the second constraint is an equality constraint representing a second order mobility of the mechanism in the output state.

3. The method of claim 2, wherein the objective function is differentiable, and the minimizing includes finding a zero of a Lagrange mapping derivative, the Lagrange mapping derivative being based on an insertion of the constraints in the objective function with Lagrange multipliers.

4. The method of claim 3, wherein the objective function is twice differentiable, and the finding includes integrating, starting from a point corresponding to the input state, a differential equation corresponding to a vector field, each stable equilibrium point of the vector field being a zero of the Lagrange mapping derivative.

5. The method of claim 4, wherein the differential equation is of a type:

$$\begin{pmatrix} x' \\ \lambda' \end{pmatrix} = -L''(x, \lambda)^T L'(x, \lambda)$$

where:
L denotes the Lagrange mapping,
x denotes unknowns of minimization, and
$\lambda$ denotes the Lagrange multipliers.

6. The method of claim 2, wherein the equality constraint is of a type:

$$F(u, p) = 0$$
$$F_p(u, p)v = 0$$
$$F_p(u, p)vv + F_{pp}(u, p)w = 0$$
$$\|v\|^2 - 1 = 0$$
$$\langle v, w \rangle = 0$$

where:
F denotes the closure equation,
u denotes dimensional values of the mechanism,
p denotes positional values of the mechanism,
v denotes tangents of a trajectory of the mechanism, and
w denotes curvatures of the trajectory.

7. The method of claim 1, wherein the constraints further include a third constraint representing rigid joint absence.

8. The method of claim 7, wherein the third constraint is of a type:

$$\beta\left(\prod_{i=1}^{n} v_i\right)\left(\prod_{i=1}^{m} u_i\right) - 1 = 0$$

where:
- $\beta$ denotes a scalar,
- $v_i$ denotes coordinate i of v,
- $u_i$ denotes coordinate i of u,
- n denotes all coordinates of v, where n is equal to or greater than 1, and
- m denotes all coordinates of u, where m is equal to or greater than 1.

9. The method of claim 1, wherein the constraints further include a fourth constraint representing non-degeneration of the mechanism in the output state.

10. A non-transitory computer readable storage medium having recorded thereon a computer program, the computer program including instructions for performing the method according to claim 1.

11. The non-transitory computer readable storage medium of claim 10, wherein the second constraint is an equality constraint representing a second order mobility of the mechanism in the output state.

12. The non-transitory computer readable storage medium of claim 11, wherein the objective function is differentiable, and the minimizing includes finding a zero of a Lagrange mapping derivative, the Lagrange mapping derivative being based on an insertion of the constraints in the objective function with Lagrange multipliers.

13. The non-transitory computer readable storage medium of claim 12, wherein the objective function is twice differentiable, and the finding comprise integrating, starting from a point corresponding to the input state, a differential equation corresponding to a vector field, each stable equilibrium point of the vector field being a zero of the Lagrange mapping derivative.

14. The non-transitory computer readable storage medium of claim 13, wherein the differential equation is of a type:

$$\begin{pmatrix} x' \\ \lambda' \end{pmatrix} = -L''(x, \lambda)^T L'(x, \lambda)$$

where:
- L denotes the Lagrange mapping,
- x denotes unknowns of minimization, and
- $\lambda$ denotes the Lagrange multipliers.

15. The non-transitory computer readable storage medium of claim 11, wherein the equality constraint is of a type:

$$F(u, p) = 0$$
$$F_p(u, p)v = 0$$
$$F_p(u, p)vv + F_{pp}(u, p)w = 0$$
$$\|v\|^2 - 1 = 0$$

$$\langle v, w \rangle = 0$$

where:
- F denotes the closure equation,
- u denotes dimensional values of the mechanism,
- p denotes positional values of the mechanism,
- v denotes tangents of a trajectory of the mechanism, and
- w denotes curvatures of the trajectory.

16. The non-transitory computer readable storage medium of claim 10, wherein the constraints further include a third constraint representing rigid joint absence.

17. The non-transitory computer readable storage medium of claim 16, wherein the third constraint is of a type:

$$\beta\left(\prod_{i=1}^{n} v_i\right)\left(\prod_{i=1}^{m} u_i\right) - 1 = 0$$

where:
- $\beta$ denotes a scalar,
- $v_i$ denotes coordinate i of v, and
- $u_i$ denotes coordinate i of u,
- n denotes all coordinates of v, where n is equal to or greater than 1, and
- m denotes all coordinates of u, where m is equal to or greater than 1.

18. The non-transitory computer readable storage medium of claim 10, wherein the constraints further include a fourth constraint representing non-degeneration of the mechanism in the output state.

19. A system comprising:
a processor coupled to a memory and a graphical user interface (GUI), the memory having recorded thereon a computer program, the computer program including instructions for designing a mobile mechanism including rigid bodies and mechanical joints, the mechanism having parameters including dimensional parameters and positional parameters, the mechanism having a closure equation involving parameter values, that when executed by the processor causes the processor to be configured to:

obtain input parameter values from a user via the graphical user interface (GUI) representing an immobile mechanism in an input state defined by the user selecting graphical representations of the rigid bodies and mechanical joints, the input parameter values including input dimensional values of the selected rigid bodies and mechanical joints, and determine output parameter values representing the mobile mechanism in an output state, the output parameter values including output dimensional values, the processor is further configured to determine the output parameter values by being further configured to minimize an objective function under constraints, the objective function penalizing a distance between the output dimensional values and the input dimensional values, the constraints including a first constraint representing verification of the closure equation by the output parameter values, and a second constraint representing mobility of the mechanism in the output state, wherein the determined output parameter values are applied in a manufacturing process of the mechanism such that the mechanism, in the output state, is closed and mobile, thereby increasing the productivity of the manufacturing process by increasing the speed of the designing by the user.

20. A computer-implemented method for designing and applying a mobile mechanism including rigid bodies and mechanical joints generated in computer aided design, the mechanism having parameters including dimensional parameters and positional parameters, the mechanism having a closure equation involving parameter values, the method comprising:

obtaining input parameter values from a user via a graphical user interface (GUI) representing an immobile mechanism in an input state defined by the user selecting graphical representations of the rigid bodies and mechanical joints, the input parameter values including input dimensional values of the selected rigid bodies and mechanical joints; and determining output parameter values representing the mobile mechanism in an output state, the output parameter values including output dimensional values, the determining including minimizing an objective function under constraints, the objective function penalizing a distance between the output dimensional values and the input dimensional values, the constraints including a first constraint representing verification of the closure equation by the output parameter values, and a second constraint representing mobility of the mechanism in the output state;

generating a three-dimensional modelled object based on the determined output parameter values; and manufacturing of the mechanism in a manufacturing process based on the generated three-dimensional modelled object such that the mechanism, in the output state, is closed and mobile, thereby increasing the productivity of the manufacturing process by increasing the speed of the designing by the user.

* * * * *